US007236708B2

(12) United States Patent
Shimada et al.

(10) Patent No.: US 7,236,708 B2
(45) Date of Patent: Jun. 26, 2007

(54) OPTICAL COMMUNICATION SYSTEM WITH OPTICAL OUTPUT LEVEL CONTROL FUNCTION

(75) Inventors: Tatsuya Shimada, Yachiyo (JP); Naoya Sakurai, Tokyo (JP); Hideaki Kimura, Sapporo (JP)

(73) Assignee: Nippon Telegraph and Telephone Corporation, Chiyoda-ku (JP)

( * ) Notice: Subject to any disclaimer, the term of this patent is extended or adjusted under 35 U.S.C. 154(b) by 708 days.

(21) Appl. No.: 10/277,489

(22) Filed: Oct. 22, 2002

(65) Prior Publication Data

US 2003/0095314 A1 May 22, 2003

(30) Foreign Application Priority Data

Oct. 25, 2001 (JP) ............................ 2001-327483
Feb. 22, 2002 (JP) ............................ 2002-045955

(51) Int. Cl.
*H04J 14/00* (2006.01)
*H04J 14/02* (2006.01)
*G02B 6/26* (2006.01)
*G02B 6/42* (2006.01)
*H04B 10/12* (2006.01)

(52) U.S. Cl. .......................... 398/141; 398/66; 398/69; 398/79; 398/82; 385/15; 385/27; 385/39

(58) Field of Classification Search ............ 398/1–200; 385/15, 27–28, 31–32, 39, 41–48
See application file for complete search history.

(56) References Cited

U.S. PATENT DOCUMENTS 3,874,779 A * 4/1975 Thiel ........................... 385/44
3,977,764 A * 8/1976 d'Auria et al. ............... 385/25
4,135,779 A * 1/1979 Hudson ....................... 385/45
4,431,260 A * 2/1984 Palmer ........................ 385/51
4,783,851 A * 11/1988 Inou et al. ..................... 398/59
4,787,693 A * 11/1988 Kogelnik et al. ............. 385/46
4,799,749 A * 1/1989 Borner et al. ................. 385/14
4,873,681 A * 10/1989 Arthurs et al. ................ 398/51
4,943,136 A * 7/1990 Popoff ......................... 385/46
4,977,593 A * 12/1990 Ballance ........................ 380/2
5,044,715 A * 9/1991 Kawachi et al. .............. 385/42
5,050,950 A * 9/1991 Takahashi .................... 385/24
5,066,094 A * 11/1991 Takahashi .................... 385/73

(Continued)

FOREIGN PATENT DOCUMENTS

| | | |
|---|---|---|
| JP | 04269023 | 9/1992 |
| JP | 08-079185 | 3/1996 |
| JP | 10-041897 | 2/1998 |
| JP | 11136192 | 5/1999 |
| JP | 2001-060921 | 3/2001 |
| JP | 2001-268055 | 9/2001 |
| JP | 2002-057627 | 2/2002 |

*Primary Examiner*—M. R. Sedighian
(74) *Attorney, Agent, or Firm*—Day Pitney LLP

(57) ABSTRACT

An optical communication system can increase a minimum optical reception level or the number of connectable optical receivers by controlling optical output levels of its optical transmitter. The optical communication system includes the optical transmitter having an optical variable splitting controller for splitting received light into N parts and supplies them to N optical fibers, and N optical receivers for receiving the signals sent via the N optical fibers. The optical variable splitting controller regulates its optical output levels to be supplied to the N optical fibers by controlling the optical coupling ratios. For example, the optical variable splitting controller may regulate its optical output levels by controlling its optical coupling ratios such that optical reception levels become equal for all the N optical receivers.

11 Claims, 16 Drawing Sheets

U.S. PATENT DOCUMENTS 5,103,491 A * 4/1992 Kuzuta .......................... 385/9
5,136,669 A * 8/1992 Gerdt .......................... 385/39
5,173,899 A * 12/1992 Ballance ..................... 370/503
5,221,983 A * 6/1993 Wagner ....................... 398/72
5,341,232 A * 8/1994 Popp ........................... 398/61
5,426,714 A * 6/1995 Gadkaree et al. ............. 385/39
5,570,442 A * 10/1996 Arii et al. ..................... 385/46
5,572,611 A * 11/1996 Jinguji et al. ................. 385/17
5,574,589 A * 11/1996 Feuer et al. .................. 398/92
5,661,585 A * 8/1997 Feldman et al. .............. 398/63
5,694,234 A 12/1997 Darcie et al. ............... 359/125
5,808,764 A * 9/1998 Frigo et al. ................... 398/72
5,974,216 A * 10/1999 Nakaya ...................... 385/140
6,134,034 A * 10/2000 Terahara ........................ 398/1
6,163,395 A 12/2000 Nemecek et al. ........... 359/187
6,411,417 B1 * 6/2002 Roberts et al. ............. 398/177
6,414,768 B1 * 7/2002 Sakata et al. ................. 398/59
6,490,391 B1 * 12/2002 Zhao et al. ................... 385/30
6,563,987 B1 * 5/2003 Takahashi .................... 385/39
H002075 H * 8/2003 Gnauck et al. ............... 398/58
6,915,079 B1 * 7/2005 Unitt et al. ................... 398/99
2001/0046075 A1 * 11/2001 Kouyama ................... 359/110
2001/0046344 A1 * 11/2001 Hayashi et al. ............... 385/15

* cited by examiner

OPTICAL TRANSMISSION LEVEL 1 2 ... L

OPTICAL RECEPTION LEVEL 1 2 ... L

OPTICAL COMMUNICATION SYSTEM WITH OPTICAL OUTPUT LEVEL CONTROL FUNCTION

This application is based on Japanese Patent Application No. 2001-327483 filed Oct. 25, 2001 and No. 2002-045955 filed Feb. 22, 2002, the content of which are incorporated hereinto by reference.

BACKGROUND OF THE INVENTION

1. Field of the Invention

The present invention relates to an optical communication system, and particularly to an optical communication system with an optical output level control function for controlling the optical output level of an access section in the optical transmission, and to a two-way optical communication system for carrying out 1×L two-way communications between one optical transmitting/receiving unit (master station) and L optical transmitting/receiving units (slave stations). Here, an optical signal transmitted from the master station to a slave station is called a downlink optical signal, and an optical signal transmitted from a slave station to the master station is called an uplink optical signal.

2. Description of the Related Art

FIGS. 1 to 5 each show an example of a conventional optical communication system with an optical transmitter. FIG. 1 shows a configuration of an optical communication system including an optical transmitter with an optical splitter for splitting an optical signal to optical signals with equal optical output levels, and optical receivers connected to the optical transmitter via optical fibers.

FIG. 2 shows a configuration of an optical communication system including an optical transmitter with an optical splitter for optically splitting an optical signal to signals with equal optical output levels, optical couplers connected to the optical transmitter via optical fibers, and optical receivers connected to the optical couplers via optical fibers. FIG. 3 shows a calculation example of a minimum optical reception level in FIG. 1, and FIG. 4 shows a calculation example of a minimum optical reception level in FIG. 2.

In the present specification, although optical signal is split by an optical transmitter, by a remote variable splitter or by an optical coupler, optical signal passing through the splitting do not always have the same optical levels at the optical receivers. In the present specification, the minimum level among the levels received by the optical receivers is called a minimum optical reception level.

The optical communication system of FIG. 1 includes an optical transmitter 201 with an optical splitter 2012 for splitting an optical signal fed from an optical fiber 2011 to N optical signals with the same optical output level, and N optical receivers 401, 402, . . . , and 40N connected to the optical transmitter 201 via N optical fibers 301, 302, . . . , and 30N.

FIG. 3 shows a calculation example of obtaining the minimum optical reception level Pin_min (dBm) in the optical communication system as shown in FIG. 1. Here, the optical receiver connected to the optical transmitter 201 via an ith (i=1 to N) optical fiber is denoted as an optical receiver (i). Assume that the optical output level of the optical fiber 2011 is Pout (dBm), the transmission loss of the ith optical fiber is L(i) (dB), and the optical reception level of the optical receiver (i) is Pin(i) (dBm). All the coupling ratios of the optical output levels of the optical splitter 2012 are 1/N. This is because the optical splitter 2012 splits the input optical signal to the same output levels, and the number of the optical receivers connected to the optical splitter 2012, that is, the splitting number of the optical splitter 2012 is N.

The coupling ratio gives the optical loss of the optical splitter 2012 of 10 $\log_{10}$N (dB) per branch. Thus, the relationship between the optical output level Pout (dBm) and the optical reception level Pin(i) (dBm) at the optical receiver (i) is given by the following equation.

$$Pout-10\log_{10}N-L(i)=Pin(i)(i=1\text{ to }N) \quad (1)$$

Since the left-hand terms Pout and 10 $\log_{10}$N of equation (1) are constant for all the optical receivers, the optical reception level becomes minimum when L(i) is maximum. By denoting the minimum optical reception level as Pin_min (dBm), and the transmission loss when the optical reception level of the optical receiver is minimum as Lmax (dB), the following equation holds.

$$Pout-10\log_{10}N-L\max=Pin\_min \quad (2)$$

Next, the configuration of FIG. 2 will be described. The optical communication system of FIG. 2 comprises: an optical transmitter 501 including an optical splitter 5012 for splitting the optical signal fed through an optical fiber 5011 to optical signals with the same optical output level; N optical couplers 701, 702, . . . , and 70N connected to the optical transmitter 501 via N optical fibers 601, 602, . . . , and 60N; $m_1$ optical receivers 911, 912, . . . , and 91$m_1$ connected to the first optical coupler 701 via $m_1$ optical fibers 811, 812, . . . , and 81$m_1$; $m_2$ optical receivers 921, 922, . . . , and 92$m_2$ connected to the second optical coupler 702 via $m_2$ optical fibers 821, 822, . . . , and 82$m_2$; and $m_N$ optical receivers 9N1, 9N2, . . . , and 9N$m_N$ connected to Nth optical coupler 70N via $m_N$ optical fibers 8N1, 8N2, . . . , and 8N$m_N$.

FIG. 4 shows a calculation example of obtaining the minimum optical reception level Pin_min (dBm) in the optical communication system as shown in FIG. 2. Here, the optical receiver connected to the optical transmitter 501 via an ith optical fiber and jth optical fiber (j=1 to $m_i$) is denoted as an optical receiver (i,j) (i=1 to N, j=1 to $m_i$).

Assume that the optical output level of the optical fiber 5011 is Pout (dBm), the total transmission loss of the ith and jth optical fibers is L(i,j) (dB), and the optical reception level of the optical receiver (i,j) is Pin(i,j) (dBm). All the coupling ratios of the optical output levels of the optical splitter 5012 are 1/N.

This is because the optical splitter 5012 splits the input optical signal to the same output levels, and the number of the optical couplers connected to the optical splitter 5012, that is, the splitting number of the optical splitter 5012 is N. Thus, the coupling ratio gives the optical loss of the optical splitter 5012 of 10 $\log_{10}$N (dB) per branch. In addition, since the optical couplers 701, 702, . . . , and 70N each have the splitting number $m_i$, and the optical couplers each split the optical input into the same output levels, the optical loss of the optical couplers 701, 702, . . . , and 70N is given by 10 $\log_{10}m_i$ (dB) per branch.

Accordingly, the relationship between the optical output level Pout (dBm) and the optical reception level Pin(i,j) (dBm) at the optical receiver (i,j) is given by the following equation.

$$Pout-10\log_{10}N-\{10\log_{10}m_i+L(i,j)\}=Pin(i,j)\ (i=1\text{ to }N, j=1\text{ to }m_i) \quad (3)$$

Since the left-hand terms Pout and 10 $\log_{10}$N of equation (3) are constant for all the optical receivers, the optical reception level becomes minimum when 10 $\log_{10}m_i$+L(i,j) is maximum. By denoting (i,j) when the optical reception level of the optical receiver is minimum as (u, v), the following equation holds.

$$Pout-10\log_{10}N-\{10\log_{10}m_u+L(u,v)\}=Pin\_min \quad (4)$$

As described above, the optical reception levels of the optical receivers of the conventional optical communication system depend on the transmission loss L(i), splitting number and transmission loss $\{10 \log_{10}m_i+L(i,j)\}$.

The optical communication systems as shown in FIGS. 1 and 2, however, have a problem of high cost. This is because in the optical communication systems as shown in FIGS. 1 and 2, it is necessary for the optical receivers with smaller optical reception levels to be more sensitive than the optical receivers with greater optical reception levels to receive the lower intensity light.

Thus, the optical communication systems as shown in FIGS. 1 and 2 have the problem of increasing the cost because of the highly sensitive optical receivers.

Furthermore, the optical communication systems as shown in FIGS. 1 and 2 have another problem of having low output efficiency of the optical signals as the optical communication systems in their entirety. This is because receiving the light with the intensity more than necessary, the optical receivers with higher optical reception levels in the optical communication systems as shown in FIGS. 1 and 2 waste the light as the total optical communication systems.

FIG. 5A shows a conventional two-way optical communication system including one optical transmitting/receiving unit 1 and L optical transmitting/receiving units 2-1 to 2-L, which are connected in a 1×L fashion via an optical fiber 3-0, 1×L optical coupler 4, and L optical fibers 3-1 to 3-L. The optical coupler 4 splits a downlink optical signal with a wavelength λd transmitted from the optical transmitting/receiving unit 1 to L parts, and transmits them to the optical transmitting/receiving units 2-1 to 2-L. Reversely, the optical coupler 4 combines uplink optical signals with a wavelength λu transmitted from the optical transmitting/receiving units 2-1 to 2-L, and transmits the combined signal to the optical transmitting/receiving unit 1.

The optical coupler 4 has equal 1/L coupling ratios so that the downlink optical signal through the optical fiber 3-0 is split to the optical fibers 3-1 to 3-L at the same level, and the uplink optical signals via the optical fibers 3-1 to 3-L are combined to the optical fiber 3-0 at the level with the same coupling loss subtracted.

However, the optical fibers 3-1 to 3-L connecting the optical coupler 4 with L optical transmitting/receiving units 2-1 to 2-L as shown in FIG. 5A have different transmission losses in accordance with the transmission distances, though the optical coupler 4 has the equal coupling ratios. Accordingly, although the downlink optical signals have the same level at the input terminals of the optical fibers 3-1 to 3-L as illustrated in FIG. 5B, the optical transmitting/receiving units 2-1 to 2-L have different optical reception levels because of the variations in the transmission loss. On the other hand, as for the uplink optical signals, even if they have variations in the optical levels at the output terminals of the optical fibers 3-1 to 3-L, they are combined as they are and received by the optical transmitting/receiving unit 1. Specifically, as illustrated in FIG. 5C, the optical reception levels of the signals sent from the optical transmitting/receiving units 2-1 to 2-L differ at the optical transmitting/receiving unit 1.

Therefore the optical transmitting/receiving unit 1 and optical transmitting/receiving units 2-1 to 2-L each require a highly sensitive, wide dynamic range photo-detection circuit that can cope with the variations in the optical reception levels and the minimum optical reception level, thereby increasing the system cost.

As a technique to circumvent such problems, Japanese Patent Application Laid-open No. 4-269023 (1992) discloses a method in which slave stations transmit constant level signals to enable a master station to adjust optical attenuation and to transmit different level signals to the slave stations. In addition, Japanese Patent Application Laid-open No. 11-136192 (1999) discloses a method in which a master station adjusts the transmission level for each slave station so that the reception levels of the individual slave stations with different transmission losses become equal.

However, configuring a 1×L optical coupler 4 by combining Mach-Zehnder interferometer type 1×2 optical couplers, for example, presents a problem of the wavelength dependence of the individual 1×2 optical couplers. Specifically, the equal coupling ratio for the downlink optical signals with the wavelength λd is not always equal for the uplink optical signals with the wavelength λu. Furthermore, when the downlink optical signals and the uplink optical signals are wavelength division multiplexed optical signals including multiple wavelengths, the coupling ratios are never equal for the wavelength division multiplexed optical signals because the coupling ratios vary in accordance with the individual wavelengths.

SUMMARY OF THE INVENTION

The present invention is implemented to solve the foregoing problems. It is therefore an object of the present invention to provide an optical communication system with an optical output level control function capable of increasing the minimum optical reception level by controlling the optical output levels of its optical transmitter to promote economy of its optical receivers, and by extension of the entire optical communication system, or to provide an optical communication system with an optical output level control function capable of increasing the number of connectable optical receivers.

Another object of the present invention to provide a two-way optical communication system capable of reducing the dynamic range and sensitivity of photo-detectors in the two-way optical communication system that includes optical couplers for coupling different wavelengths optical signals for its downlink and uplink, or wavelength division multiplexed optical signals, by carrying out the control in such a manner that makes the difference between the maximum optical reception level and minimum optical reception level of each optical transmitting/receiving unit less than a specified value, or that makes its minimum optical reception level more than a specified value.

To accomplish the objects, according to a first aspect of the present invention, there is provided an optical communication system comprising: an optical transmitter including an optical variable splitting controller for splitting received light into N parts, and supplying them to N optical fibers, where N is an integer greater than one; and N optical receivers for receiving the output light of the optical transmitter via the N optical fibers, wherein the optical variable splitting controller regulates its output levels to be delivered to the optical receivers independently by controlling its optical coupling ratios.

With the foregoing configuration in accordance with the present invention, the optical variable splitting controller controls its output levels in such a manner that it does not supply the optical signals with levels more than necessary to the optical receivers connected via the optical fibers with a smaller transmission loss. At the same time, the optical variable splitting controller increases the optical output levels for the optical receivers connected via the optical fibers with a larger transmission loss by exploiting the extra power obtained by reducing the power for the optical receivers connected via the optical fibers with the smaller transmission loss, thereby increasing the optical reception levels of the optical receivers. Thus, the minimum optical reception level of the optical receivers can be increased.

In the first aspect of the present invention, the optical variable splitting controller may regulate its optical output levels by controlling its optical coupling ratios such that optical reception levels become equal for all the N optical receivers.

According to a second aspect of the present invention, there is provided an optical communication system comprising: an optical transmitter including a multistage optical variable splitting controller for splitting received light into N parts, and supplying them to N optical fibers, where N is an integer greater than one; N optical couplers for receiving outputs of the optical transmitter via the N optical fibers, each of the N optical couplers delivering its received signal to $m_i$ optical fibers, where suffix i varies from one to N; and $m_i$ optical receivers for receiving outputs of one of the N optical couplers via the $m_i$ optical fibers, wherein the multistage optical variable splitting controller regulates its output levels to be delivered to the optical receivers independently by controlling its optical coupling ratios.

With the foregoing configuration in accordance with the present invention, the multistage optical variable splitting controller controls its output levels in such a manner that it does not supply the optical signals with levels more than necessary to the optical receivers connected via the optical fibers with a smaller transmission loss. At the same time, the optical variable splitting controller increases the optical output levels for the optical receivers connected via the optical fibers with a larger transmission loss by exploiting the extra power obtained by reducing the power for the optical receivers connected via the optical fibers with the smaller transmission loss, thereby increasing the optical reception levels of the optical receivers. Thus, the minimum optical reception level of the optical receivers can be increased.

In the second aspect of the present invention, as for N optical receivers, each of which has a maximum optical loss from an input of the one of the optical couplers to inputs of the $m_i$ optical receivers connected to the one of the optical couplers, the multistage optical variable splitting controller may regulate its optical output levels by controlling its optical coupling ratios such that optical reception levels become equal for all of the N optical receivers.

According to a third aspect of the present invention, there is provided an optical communication system comprising: an optical transmitter including an optical splitter for splitting received light into N parts with equal output levels, and supplying them to N optical fibers, where N is an integer greater than one; N remote variable splitters for receiving outputs of the optical transmitter via the N optical fibers, each of the N remote variable splitters including a multistage optical variable splitting controller that splits a received optical signal to $m_i$ parts and supplies them to $m_i$ optical fibers, where suffix i varies from one to N; and $m_i$ optical receivers for receiving outputs of one of the N remote variable splitters via the $m_i$ optical fibers, wherein the multistage optical variable splitting controller regulates its output levels to be delivered to the optical receivers independently by controlling its optical coupling ratios.

With the foregoing configuration in accordance with the present invention, the multistage optical variable splitting controller controls its output levels in such a manner that it does not supply the optical signals with levels more than necessary to the optical receivers connected via the optical fibers with a smaller transmission loss. At the same time, the optical variable splitting controller increases the optical output levels for the optical receivers connected via the optical fibers with a larger transmission loss by exploiting the extra power obtained by reducing the power for the optical receivers connected via the optical fibers with the smaller transmission loss, thereby increasing the optical reception levels of the optical receivers. Thus, the minimum optical reception level of the optical receivers can be increased.

In the third aspect of the present invention, the multistage optical variable splitting controller may regulate its optical output levels by controlling its optical coupling ratios such that optical reception levels become equal for all $m_i$ optical receivers.

According to a fourth aspect of the present invention, there is provided a two-way optical communication system comprising: a first optical transmitting/receiving unit; L second optical transmitting/receiving units, where L is an integer greater than one; and a multistage multistage 1×L optical coupler connected to the first optical transmitting/receiving unit and to the L second optical transmitting/receiving units via optical fibers, the multistage 1×L optical coupler splitting a downlink optical signal with a wavelength λd transmitted from the first optical transmitting/receiving unit into L parts and transmitting them to the second optical transmitting/receiving units, and combining uplink optical signals with a wavelength λu transmitted from the second optical transmitting/receiving units and transmitting the combined signal to the first optical transmitting/receiving unit, wherein the multistage optical coupler includes means for controlling coupling ratios for the second optical transmitting/receiving units such that a difference between a minimum optical reception level and a maximum optical reception level of the downlink optical signals arriving at the second optical transmitting/receiving units is less than a specified value, and that a difference between a minimum optical reception level and a maximum optical reception level of the uplink optical signals arriving at the first optical transmitting/receiving unit from the second optical transmitting/receiving units is less than a specified value.

According to a fifth aspect of the present invention, there is provided a two-way optical communication system comprising: a first optical transmitting/receiving unit; L second optical transmitting/receiving units, where L is an integer greater than one; and a 1×L optical coupler connected to the first optical transmitting/receiving unit and to the L second optical transmitting/receiving units via optical fibers, the 1×L optical coupler splitting a downlink optical signal with a wavelength λd transmitted from the first optical transmitting/receiving unit into L parts and transmitting them to the second optical transmitting/receiving units, and combining uplink optical signals with a wavelength λu transmitted from the second optical transmitting/receiving units and transmitting the combined signal to the first optical transmitting/receiving unit, wherein the optical coupler includes means for controlling coupling ratios for the second optical transmitting/receiving units such that a minimum optical reception level of the downlink optical signals arriving at the second optical transmitting/receiving units is greater than a specified value, and that a minimum optical reception level of the uplink optical signals arriving at the first optical transmitting/receiving unit from the second optical transmitting/receiving units is greater than a specified value.

In the fourth aspect of the present invention, the optical coupler may determine its coupling ratios such that the difference between the minimum optical reception level and the maximum optical reception level becomes less than the specified value in accordance with a premeasured optical transmission level of the first optical transmitting/receiving unit and premeasured optical reception levels of the second optical transmitting/receiving units.

In the fifth aspect of the present invention, the optical coupler may determine its coupling ratios such that the minimum optical reception level of the downlink optical signals and the minimum optical reception level of the uplink optical signals each become greater than the specified value in accordance with a premeasured optical transmission level of the first optical transmitting/receiving unit, premeasured optical reception levels of the second optical transmitting/receiving units, and premeasured optical transmission levels of the second optical transmitting/receiving units.

In the fourth or fifth aspect of the present invention, optical coupler may determine its coupling ratios such that the difference between the minimum optical reception level and the maximum optical reception level becomes less than the specified value in accordance with premeasured optical transmission levels of the uplink optical signals of the second optical transmitting/receiving units, and optical reception levels of the uplink optical signals measured at the optical coupler.

In the fourth or fifth aspect of the present invention, optical coupler may determine its coupling ratios such that the minimum optical reception level becomes greater than the specified value in accordance with premeasured optical transmission levels of the uplink optical signals of the second optical transmitting/receiving units, and optical reception levels of the uplink optical signals measured at the optical coupler.

In the fourth or fifth aspect of the present invention, the downlink optical signals may be a wavelength division multiplexed optical signal that multiplexes at least two wavelengths, wherein the second optical transmitting/receiving units each receive optical signals with one or more wavelengths from the wavelength division multiplexed optical signals, and the optical coupler may determine the coupling ratios considering wavelength dependence of the coupling ratios.

In the fourth or fifth aspect of the present invention, the second optical transmitting/receiving units may each transmit an optical signal with one or more wavelengths as the uplink optical signal, and the optical coupler may determine the coupling ratios considering wavelength dependence of the coupling ratios.

According to the present invention, since the optical communication system with an optical output level control function can be implemented, the minimum optical reception level of the optical receivers can be established at a higher value in the optical communication system. In addition, implementing the present invention enables increasing the number of the connectable optical receivers, thereby being able to effectively utilizing the light that is wasted in the conventional systems. Thus, it can encourage economy of the optical communication system in its entirety.

Furthermore, according to the present invention, setting the coupling ratios in accordance with the wavelengths used by optical variable couplers can make the difference between the maximum optical reception level and the minimum optical reception level of the individual optical transmitting/receiving units less than the specified value, or make the minimum optical reception level more than the specified value. As a result, it can reduce the dynamic range of the individual optical transmitting/receiving units and the sensitivity of their photo-detectors.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The preferred embodiments of the optical communication system in accordance with the invention will now be described with reference to FIGS. 6 to 14.

First Embodiment

Figure 6:
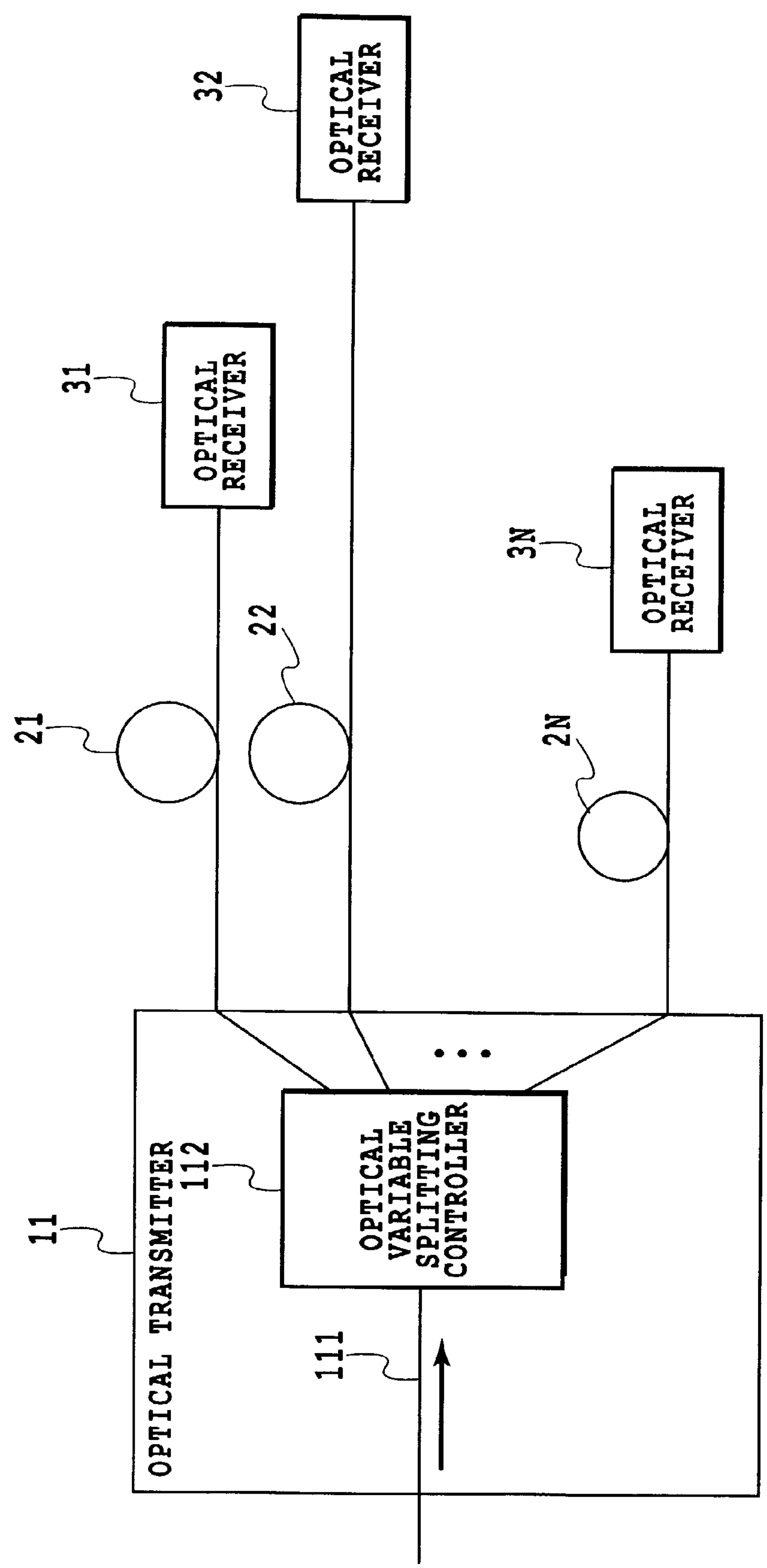
FIG. 6 is a block diagram showing the entire configuration of an embodiment of the optical communication system in accordance with the present invention.

As shown in FIG. 6, the first embodiment of the optical communication system in accordance with the present invention comprises: an optical transmitter 11 including an optical variable splitting controller 112 for splitting the optical signal passing through an optical fiber 111 with regulating the optical output levels by controlling the optical coupling ratios; and N optical receivers 31, 32, . . . , and 3N connected to the transmitter 11 via N optical fibers 21, 22, . . . , and 2N.

In the present embodiment 1, receiving the optical signal from the optical fiber 111, the optical transmitter 11 controls the optical output levels (optical levels to be supplied to the individual optical fibers 21 to 2N) independently of all the optical signals to be sent to the individual optical receivers 31 to 3N via the individual optical fibers 21 to 2N. Thus, in the present embodiment 1, the output levels of the optical signals can differ from each other for respective optical receivers, that is, for the individual optical fibers 21 to 2N connected to the optical receivers 31 to 3N.

Figure 1:
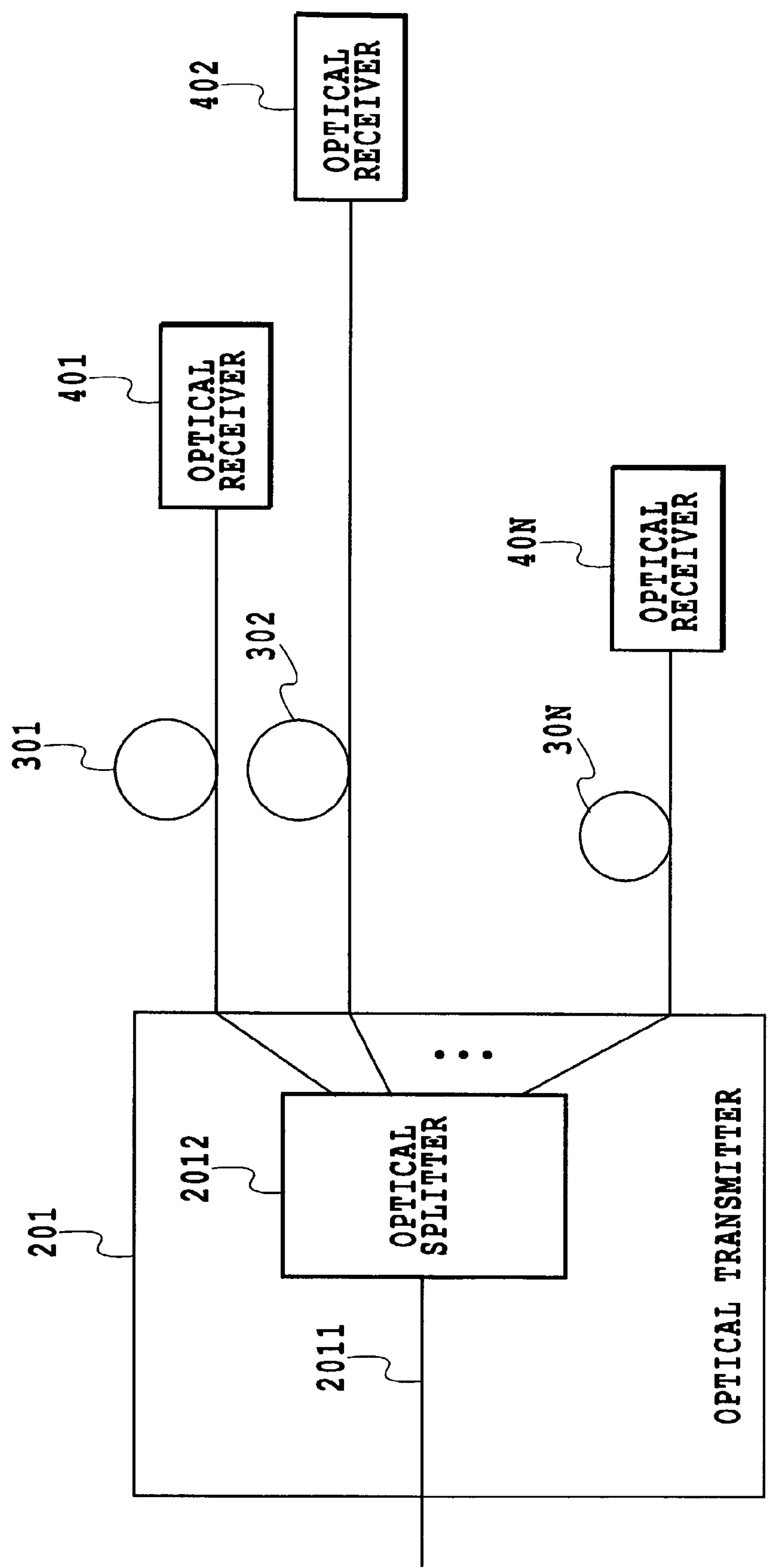
FIG. 1 is a block diagram showing a configuration of a conventional optical communication system.

It is preferable that the optical transmitter 11 control the optical output levels such that the optical reception levels become equal for all the N optical receivers. To explain this, let us compare the minimum optical reception level of the conventional example as shown in FIG. 1 with that of the present embodiment. In the following description, the optical receiver connected to the optical transmitter via the ith (i=1 to N) optical fiber is denoted as an optical receiver (i).

Assume that the optical output level of the preceding stage of the optical variable splitting controller is Pout (dBm), the optical loss from the output of the optical variable splitting controller associated with the optical receiver (i) to the optical receiver is L(i) (dB), and the optical reception level of the optical receiver (i) is Pin(i) (dBm). In addition, assume that the coupling ratios of the optical output levels of the optical variable splitting controller associated with the optical receivers (i) are given by the following equation.

$$K(i)\left(0 < K(i) < 1(i = 1 \text{ to } N),\ \sum_{i=1}^{N} K(i) = 1\right) \tag{5}$$

Then, the optical losses of the optical variable splitting controller are given by $10\log_{10}(1/K(i))$ (dB). The optical output levels are controlled in such a manner that the optical reception levels Pin(i) are denoted as a constant value Pin_con (dBm).

Thus, the relationships between the optical output levels Pout (dBm) and the optical reception levels Pin_con (dBm) of the optical receivers (i) are given by the following equation.

$$Pout-10\log_{10}(1/K(i))-L(i)=Pin\_con\ (i=1 \text{ to } N) \tag{6}$$

Since the optical optical receivers output levels are controlled such that the optical reception levels are equal for all the N optical receivers, the following equations hold in equation (6).

$$\begin{aligned}&10\log_{10}(1/K(1))+L(1)=A\\&10\log_{10}(1/K(2))+L(2)=A\\&10\log_{10}(1/K(N))+L(N)=A\end{aligned} \tag{7}$$

(A is constant)

That is, $$\begin{aligned}&K(1)=10^{-A/10}\times10^{L(1)/10}\\&K(2)=10^{-A/10}\times10^{L(2)/10}\\&K(N)=10^{-A/10}\times10^{L(N)/10}\end{aligned} \tag{8}$$

Summing up equations (8), the following equation is obtained.

$$\sum_{i=1}^{N} K(i) = 10^{-A/10} \times \sum_{i=1}^{N} 10^{L(i)/10} \tag{9}$$

In equation (9), the following equation holds.

$$\sum_{i=1}^{N} K(i) = 1 \tag{10}$$

Consequently, $$10^{-A/10} \tag{11}$$

is given by the following equation.

$$10^{-A/10} = 1 \Big/ \sum_{i=1}^{N} 10^{L(i)/10} \tag{12}$$

From equations (8) and (12), the coupling ratios K(i) are given by the following equation.

$$K(i) = 10^{L(i)/10} \Big/ \sum_{i=1}^{N} 10^{L(i)/10} (i = 1 \text{ to } N) \tag{13}$$

Substituting equation (13) into equation (6), the following equation is obtained.

$$Pout - 10 \log_{10} \sum_{i=1}^{N} 10^{L(i)/10} = \text{Pin\_con} \tag{14}$$

Next, to compare the value of the Pin_con with the Pin_min, equation (14) –equation (2) is calculated as follows.

$$-10 \log_{10} \sum_{i=1}^{N} 10^{L(i)/10} + 10 \log_{10} N + L\max = \text{Pin\_con} - \text{Pin\_min} \tag{15}$$

The left-hand side of equation (15) is given by $$\text{left-hand side} = -10\log_{10}\sum_{i=1}^{N}10^{L(i)/10} + 10\log_{10}N + L\max = 10\log_{10}\left[N\times10^{L\max/10}\Big/\sum_{i=1}^{N}10^{L(i)/10}\right] \quad (16)$$

in which since $$N\times10^{L\max/10} > \sum_{i=1}^{N}10^{L(i)/10} \quad (17)$$

holds, the following expression is given.

$$N\times10^{L\max/10}\Big/\sum_{i=1}^{N}10^{L(i)/10} > 1 \quad (18)$$

Accordingly, $$\text{left-hand side} = 10\log_{10}\left[N\times10^{L\max/10}\Big/\sum_{i=1}^{N}10^{L(i)/10}\right] > 0 \quad (19)$$

From equation (19), the right-hand side of equation (15) is given by the following expression.

$$P\text{in\_con}-P\text{in\_min}>0 \quad (20)$$

From the foregoing description, it is known that the optical reception level Pin_con of the present embodiment of the optical communication system is higher than the minimum optical reception level Pin_min of the conventional system. Consequently, it is shown that the optical communication system of the present embodiment is superior to the conventional optical communication system.

Figure 7:
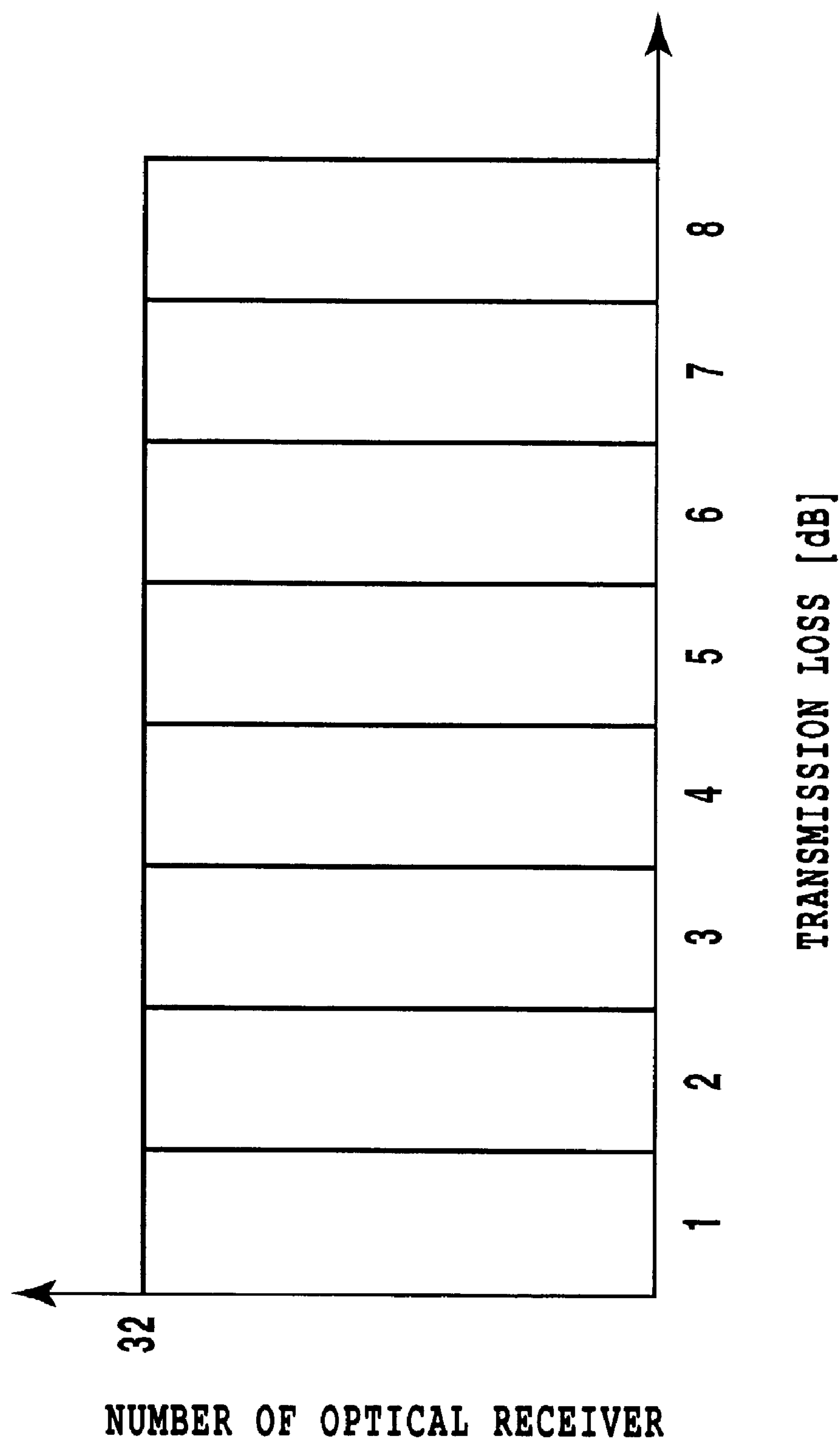
FIG. 7 is a diagram illustrating an optical receiver distribution model in the optical communication system as shown in FIG. 6.

The advantage of the present embodiment will be described in detail with reference to FIG. 7. FIG. 7 shows an example of an optical receiver distribution model in the optical communication system as shown in FIG. 6.

The optical receiver distribution model of FIG. 7 shows the transmission losses 1, 2, . . . , and 8 (dB), and the number of the optical receivers with the individual transmission losses. First, the minimum optical reception level in the optical receiver distribution model as shown in FIG. 7 is calculated for the conventional optical communication system as shown in FIG. 1.

The sum total of the optical receivers is 8×32=256. Since the splitting number of the optical splitter equals the sum total of the optical receivers, the splitting number N is 256. Hence, the optical loss of the optical splitter is $10\log_{10}256$ (dB) per branch. In addition, in the optical receiver distribution model of FIG. 7, Lmax is 8 (dB). Accordingly, the minimum optical reception level Pin_min (dBm) is obtained from equation (2) as follows.

$$P\text{out}-10\log_{10}256-8=P\text{in\_min} \quad (21)$$

Next, the minimum optical reception level is calculated for the optical communication system of FIG. 6, when the control of the present embodiment is applied to the optical receiver distribution model as shown in FIG. 7.

Let us assume that the transmission losses of the optical receivers (i) (i=(1+32(n−1)) to 32n, n=1 to 8) are L(i)=n (dB). Then the following term of equation (14)

$$\sum_{i=1}^{N}10^{L(i)/10} \quad (22)$$

is given by the following expression.

$$\sum_{i=1}^{256}10^{L(i)/10} = 10^{1/10}\times32 + 10^{2/10}\times32 + \ldots + 10^{8/10}\times32 \approx 826 \quad (23)$$

Accordingly equation (14) is expressed as $$P\text{out}-10\log_{10}826=P\text{in\_con} \quad (24)$$

Subsequently, calculate equation (24) −equation (21) as follows to compare Pin_con with Pin_min.

$$-10\log_{10}826+10\log_{10}256+8=P\text{in\_con}-P\text{in\_min} \quad (25)$$

The left-hand side of equation (25) is given by the following expression.

$$\text{left-hand side}=-10\log_{10}826+10\log_{10}256+8\approx2.9 \quad (26)$$

Accordingly, the right-hand side of equation (25) is given by the following expression.

$$P\text{in\_con}-P\text{in\_min}\approx2.9 \quad (27)$$

Consequently, the minimum optical reception level can be set higher than that of the conventional optical communication system by about 2.9 (dB).

Second Embodiment

Figure 8:
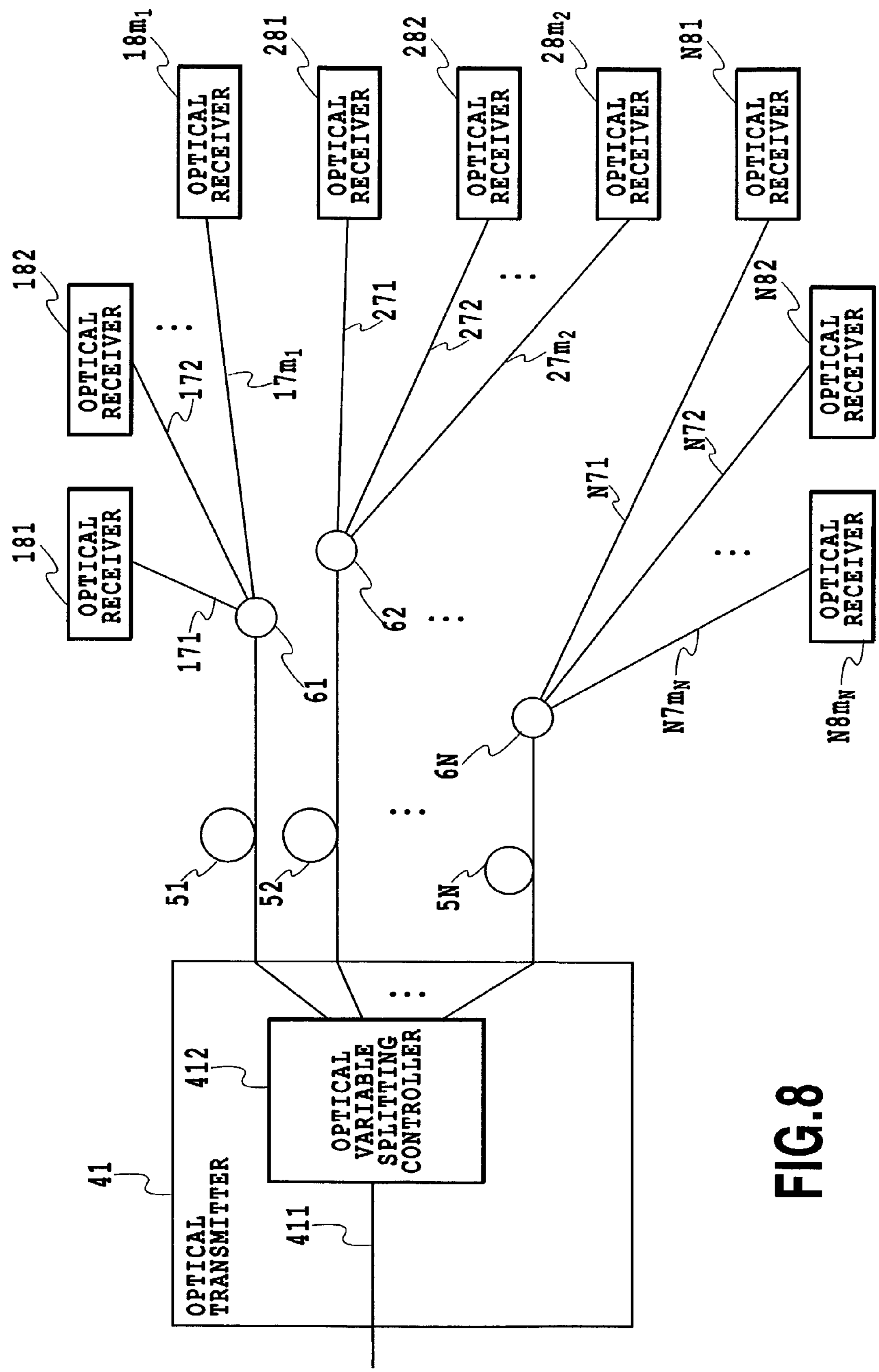
FIG. 8 is a block diagram showing the entire configuration of an embodiment of the optical communication system in accordance with the present invention.

As shown in FIG. 8, the second embodiment of the optical communication system in accordance with the present invention comprises: an optical transmitter 41 including an optical variable splitting controller 412 for splitting the optical signal fed from an optical fiber 411 with regulating the optical output levels by controlling the optical coupling ratios; N optical couplers 61, 62, . . . , and 6N connected to the optical transmitter 41 via N optical fibers 51, 52, . . . , and 5N; and optical receivers 181, 182, . . . , and 18$m_1$, 281, 282, . . . , and 28$m_2$, and N81, N82, and N8$m_N$ connected to the individual optical couplers 61, 62, . . . , and 6N via optical fiber 171, 172, . . . , and 17$m_1$, 271, 272, . . . , and 27$m_2$, and N71, N72, . . . , and N7$m_N$.

Here, receiving the optical signal passing through the optical fiber 411, the optical transmitter 41 controls the optical output levels (optical levels to be supplied to the individual optical fibers 51 to 5N) independently of all the optical signals to be sent to the individual optical couplers 61 to 6N via the individual optical fibers 51 to 5N. Thus, the output levels of the optical signals can differ from each other for respective optical couplers, that is, for the individual optical fibers 51 to 5N connected to the optical couplers 61 to 6N.

Figure 2:
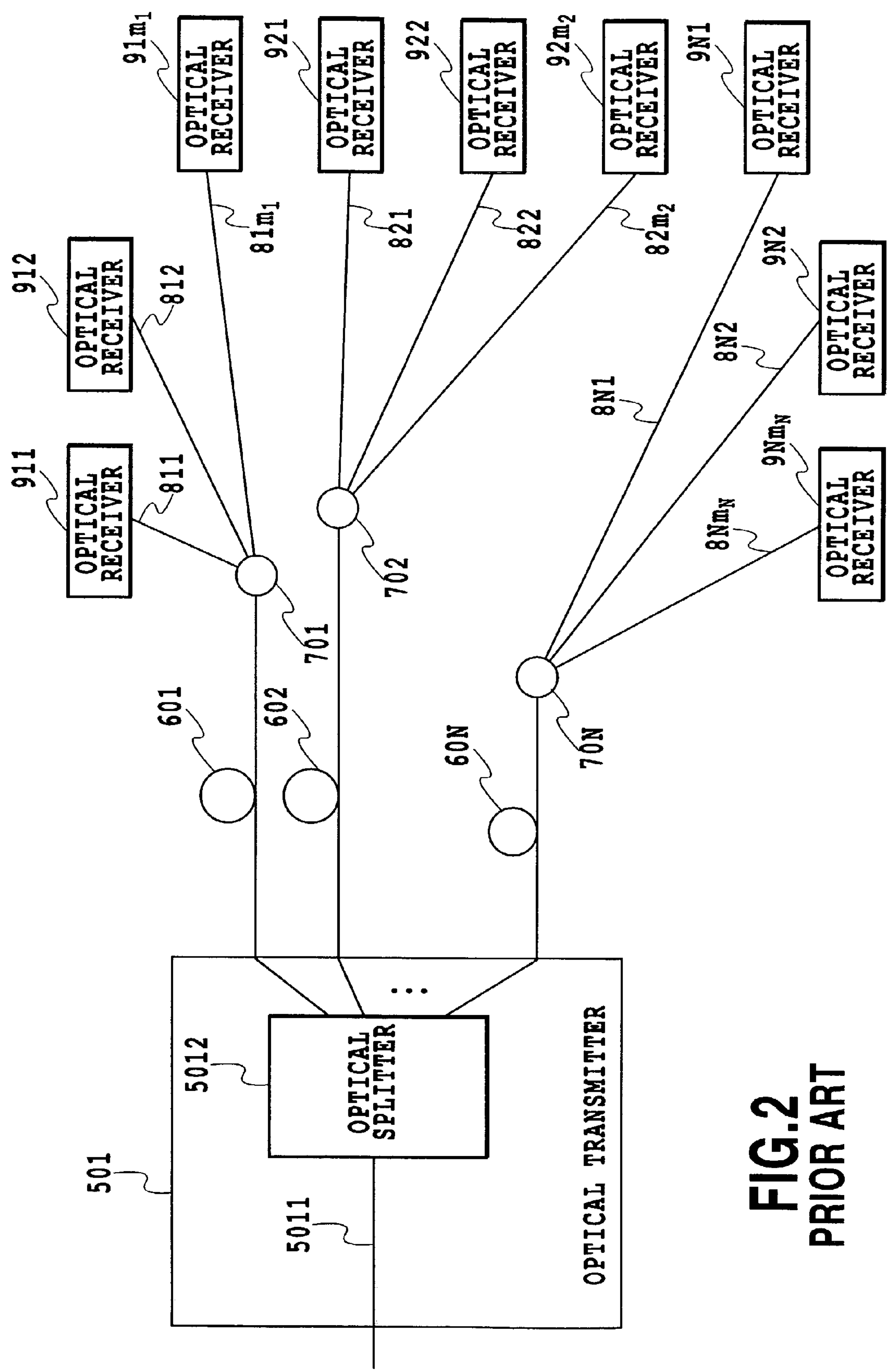
FIG. 2 is a block diagram showing a configuration of another conventional optical communication system.
Figure 3:
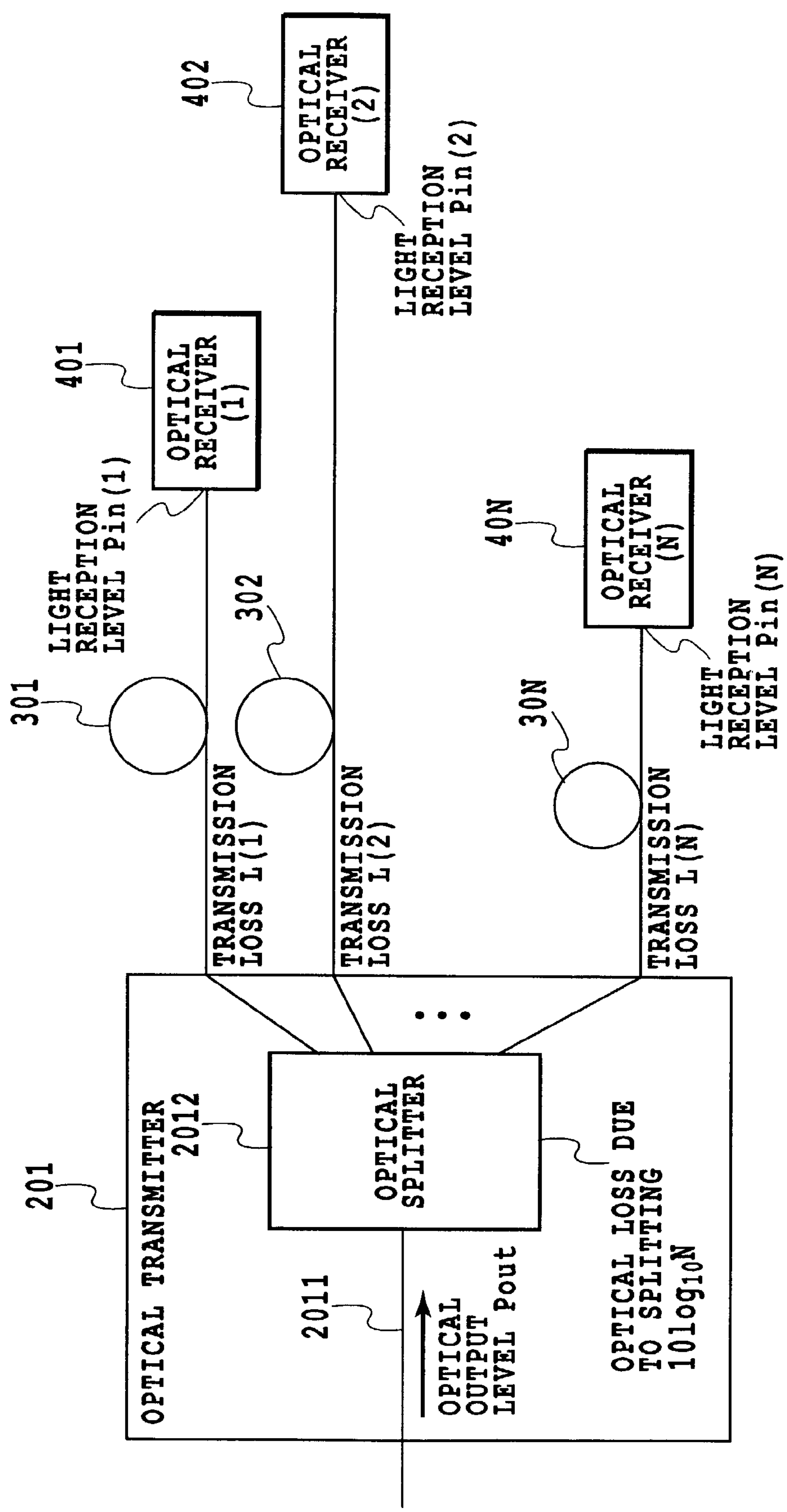
FIG. 3 is a block diagram showing a calculation example of the minimum optical reception level in the optical communication system as shown in FIG. 1.
Figure 4:
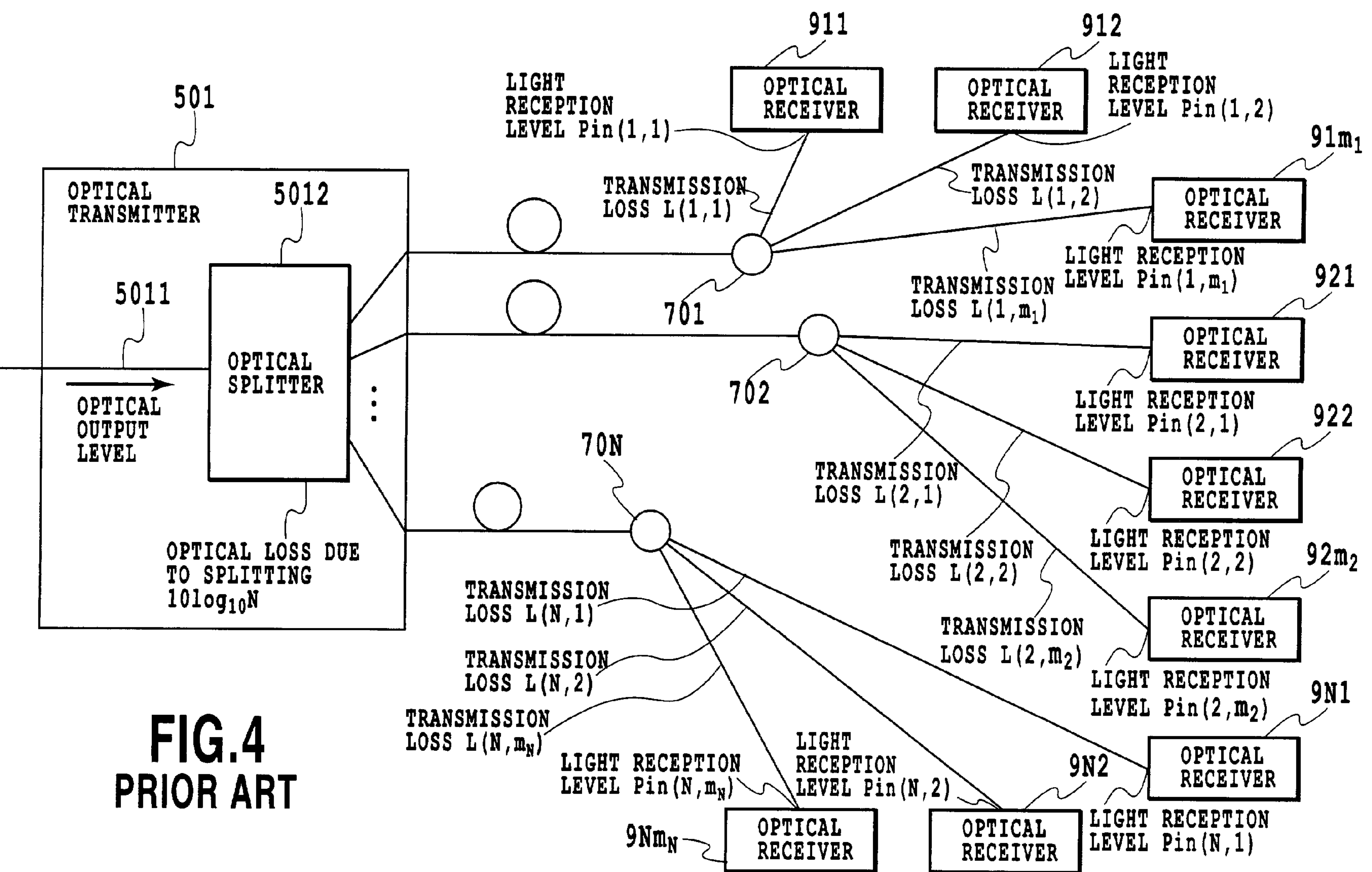
FIG. 4 is a block diagram showing a calculation example of the minimum optical reception level in the optical communication system as shown in FIG. 2.
Figure 5A:
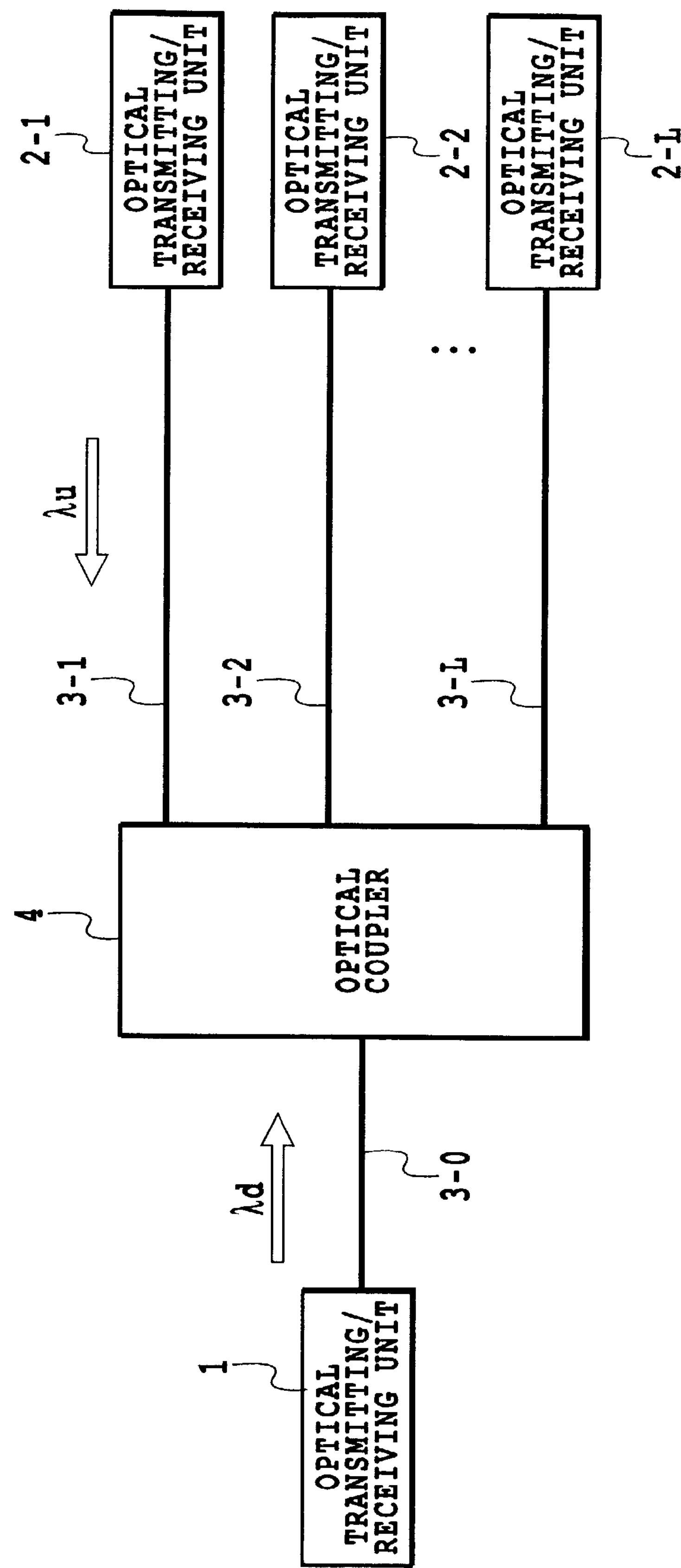
FIG. 5A is a block diagram showing a configuration of a conventional two-way optical communication system.
Figures 5B, 5C:
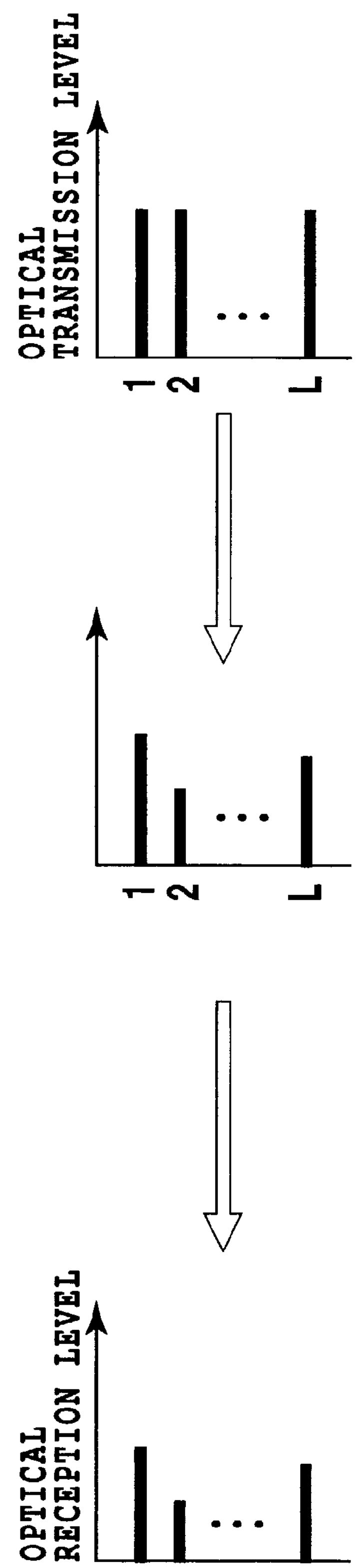
FIGS. 5B and 5C are diagrams illustrating optical losses in the conventional two-way optical communication system as shown in FIG. 5A.

Next, the minimum optical reception level of the present embodiment of the optical communication system will be compared with that of the conventional example as shown in FIG. 2. In the following description, the optical coupler connected to the ith optical fiber is denoted as C(i), and the optical receiver whose optical loss from the optical coupler C(i) to the optical receiver itself is maximum is denoted as optical receiver (i)max.

Assume that the optical output level of the preceding stage of the optical variable splitting controller is Pout (dBm), the optical loss from the output of the optical variable splitting controller associated with the optical receiver (i)max to the optical receiver is L(i) (dB), and the optical reception level of the optical receiver (i)max is Pin(i)max (dBm). In addition, assume that the coupling ratios of the optical output levels of the optical variable splitting controller associated with the optical receivers (i)max are given by the following equation.

$$K(i)\max\left(0 < K(i)\max < 1 (i = 1 \text{ to } N), \sum_{i=1}^{N} K(i)\max = 1\right) \tag{28}$$

Then, the optical losses of the optical variable splitting controller are given by $10\log_{10}(1/K(i)\max)$ (dB). In addition, the optical loss of the optical coupler C(i) is calculated as $10\log_{10}m_i$ (dB) per branch because the splitting number of the optical coupler C(i) is $m_i$, and the optical coupler splits the input light into parts with the same output levels.

In addition, since the optical output levels are controlled such that the optical reception levels Pin(i)max (dBm) are equal for all the optical receivers (i)max, the values are denoted as a constant value Pin_con_n (dBm).

Thus, the relationships between the optical output levels Pout (dBm) and the optical reception levels Pin_con_n (dBm) of the optical receivers (i)max are given by the following equation.

$$Pout-10\log_{10}(1/K(i)\max)-10\log_{10}m_i-L(i)\max=Pin\_con\_n (i=1 \text{ to } N) \tag{29}$$

It will be shown in the following that the optical reception level Pin_con_n (dBm) of the present embodiment given by equation (29) takes a greater value than the conventional minimum optical reception level Pin_min (dBm) given by equation (4).

Consider the N optical receivers whose optical losses from the optical couplers to the inputs of the optical receivers are maximum. Since the optical output levels are controlled such that the optical reception levels are equal for all the N optical receivers, the following equations hold in equation (29).

$$10\log_{10}(1/K(1)\max)+10\log_{10}m_1+L(1)\max=A$$
$$10\log_{10}(1/K(2)\max)+10\log_{10}m_2+L(2)\max=A \tag{30}$$
$$10\log_{10}(1/K(N)\max)+10\log_{10}m_N+L(N)\max=A$$

(A is constant)

That is, $$K(1)\max=10^{-A/10}\times(m_1)\times10^{L(1)max/10}$$
$$K(2)\max=10^{-A/10}\times(m_2)\times10^{L(2)max/10} \tag{31}$$
$$K(N)\max=10^{-A/10}\times(m_N)\times10^{L(N)max/10}$$

Summing up equations (31), the following equation is obtained.

$$\sum_{i=1}^{N} K(i)\max = 10^{-A/10} \times \sum_{i=1}^{N} m_i \times 10^{L(i)\max/10} \tag{32}$$

In equation (32), the following equation holds.

$$\sum_{i=1}^{N} K(i)\max = 1 \tag{33}$$

Consequently, $10^{-A/10}$ is given by the following equation.

$$10^{-A/10} = 1 \Big/ \sum_{i=1}^{N} m_i \times 10^{L(i)\max/10} \tag{34}$$

From equations (31) and (34), the coupling ratios K(i)max are given by the following equation.

$$K(i)\max = (m_i) \times 10^{L(i)\max/10} \Big/ \sum_{i=1}^{N} m_i \times 10^{L(i)\max/10} \; (i = 1 \text{ to } N) \tag{35}$$

Substituting equation (35) into equation (29), the following equation is obtained.

$$Pout - 10\log_{10}\sum_{i=1}^{N} m_i \times 10^{L(i)\max/10} = \text{Pin\_con\_n} \tag{36}$$

Next, equation (36) −equation (4) is calculated as follows to compare the Pin_con_n with the Pin_min.

$$-10\log_{10}\sum_{i=1}^{N} m_i \times 10^{L(i)\max/10} + 10\log_{10}N + 10\log_{10}m_u + L(u, v) = \text{Pin\_con\_n} - \text{Pin\_min} \tag{37}$$

The left-hand side of equation (37) is given by $$\begin{aligned}\text{left-hand side} &= -10\log_{10}\sum_{i=1}^{N} m_i \times 10^{L(i)\max/10} + 10\log_{10}N + 10\log_{10}m_u + L(u, v) \\ &= 10\log_{10}\left[N \times (m_u) \times 10^{L(u,v)/10} \Big/ \sum_{i=1}^{N} m_i \times 10^{L(i)\max/10}\right]\end{aligned} \tag{38}$$

in which since $$N \times (m_u) \times 10^{L(u,v)/10} > \sum_{i=1}^{N} m_i \times 10^{L(i)\max/10} \quad (39)$$

holds, the following expression is given.

$$N \times (m_u) \times 10^{L(u,v)/10} \Big/ \sum_{i=1}^{N} m_i \times 10^{L(i)\max/10} > 1 \quad (40)$$

Accordingly, $$\text{left-hand side} = 10\log_{10}\left[N \times (m_u) \times 10^{L(u,v)/10} \Big/ \sum_{i=1}^{N} m_i \times 10^{L(i)\max/10}\right] > 0 \quad (41)$$

From equation (41), the right-hand side of equation (37) is given by the following expression.

$$P\text{in\_con\_n}-P\text{in\_min}>0 \quad (42)$$

From the foregoing description, it is shown that the optical reception levels Pin_con_n of the present embodiment of the optical communication system is higher than the minimum optical reception level Pin_min of the conventional system. Consequently, it is proved that the optical communication system of the present embodiment is superior to the conventional optical communication system.

Figure 9:
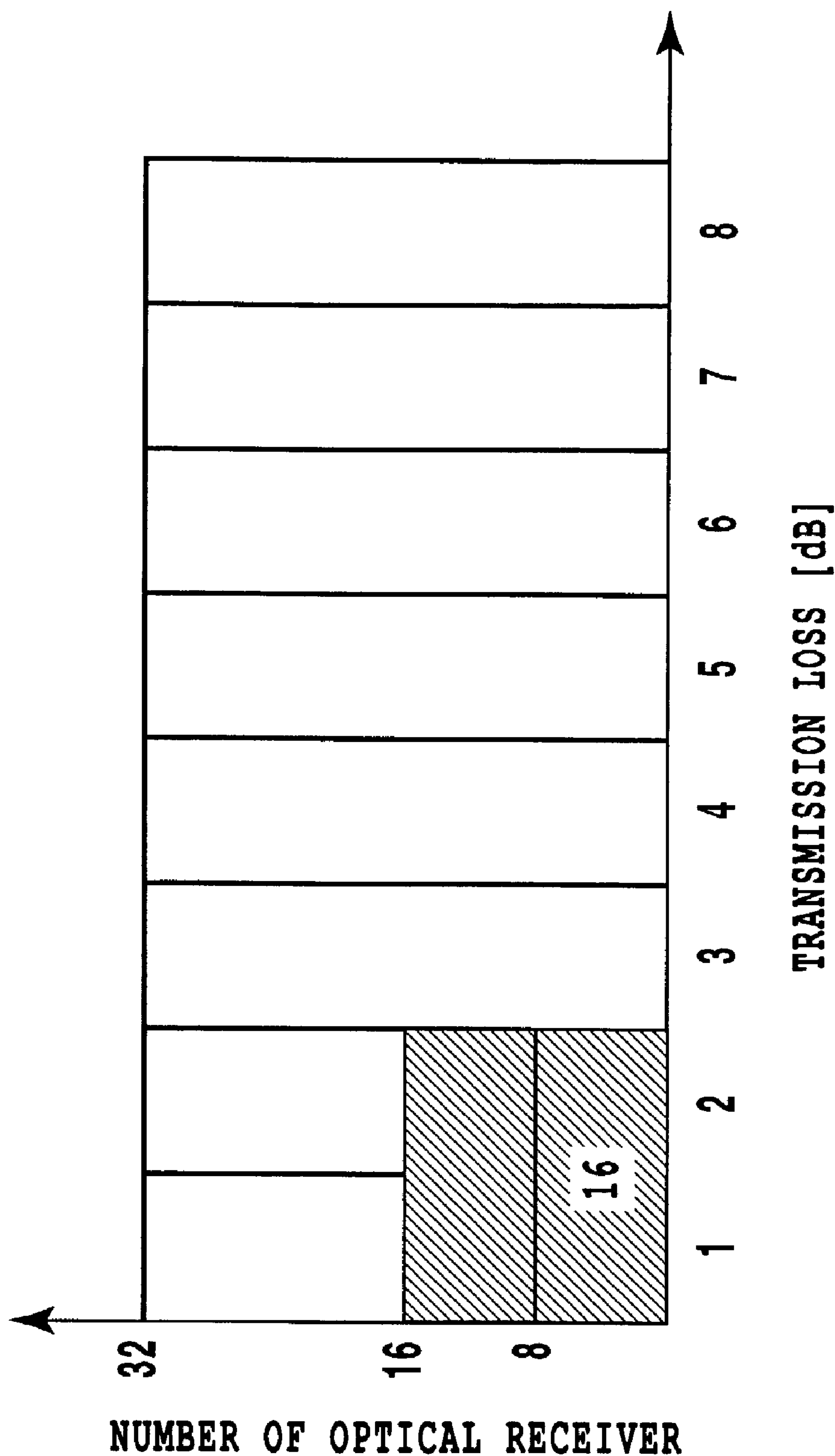
FIG. 9 is a diagram illustrating an optical receiver distribution model in the optical communication system as shown in FIG. 8.

FIG. 9 shows an example of the optical receiver distribution model in the present embodiment of the optical communication system as shown in FIG. 8.

The optical receiver distribution model of FIG. 9 shows the transmission losses 1, 2, . . . , and 8 (dB), and the number of the optical receivers with the individual transmission losses. Assume that each optical coupler has a splitting number 16, and is connected to 16 optical receivers with transmission losses of 2(n−1) to 2n (dB), where n=1 to 4, as illustrated in the shaded portion of FIG. 9.

First, the minimum optical reception level in the optical receiver distribution model as shown in FIG. 9 is calculated for the conventional optical communication system as shown in FIG. 2. The sum total of the optical receivers is 8×32=256. Since the splitting number of each optical splitter equals the quotient obtained by dividing the sum total of the optical receivers by the splitting number of the optical couplers, the splitting number N is 256/16=16. Hence, the optical loss of the optical splitter is $10\log_{10}16$ (dB) per branch.

Likewise, the optical loss of each optical coupler is $10\log_{10}16$ (dB) per branch. In addition, in the optical receiver distribution model of FIG. 9, the maximum loss L(u, v) is 8 (dB). Accordingly, the minimum optical reception level Pin_min (dBm) is obtained as follows from equation (4).

$$P\text{out}-10\log_{10}16-10\log_{10}16-8=P\text{in\_min} \quad (43)$$

Next, the minimum optical reception level in the second embodiment of the optical communication system of FIG. 8 is calculated when applying the control of the present embodiment to the optical receiver distribution model as shown in FIG. 9.

The transmission losses of the optical receivers (i)max whose optical losses from the optical couplers to the optical receivers themselves are maximum are 2, 4, 6, and 8 (dB). Then the following term of equation (36)

$$\sum_{i=1}^{N} m_i \times 10^{L(i)\max/10} \quad (44)$$

is given by the following expression.

$$\sum_{i=1}^{N} m_i \times 10^{L(i)\max/10} = 16 \times 10^{2/10} \times 4 + 16 \times 10^{4/10} \times 4 + \ldots + 16 \times 10^{8/10} \times 4 \approx 921 \quad (45)$$

Accordingly, equation (36) is expressed as $$P\text{out}-10\log_{10}921=P\text{in\_con\_n} \quad (46)$$

Subsequently, equation (46) −equation (43) is calculated as follows to compare Pin_con_n with Pin_min.

$$-10\log_{10}921+10\log_{10}16+10\log_{10}16+8=P\text{in\_con\_n}-P\text{in\_min} \quad (47)$$

The left-hand side of equation (47) is given by the following expression.

$$\text{left-hand side}=-10\log_{10}921+10\log_{10}16+10\log_{10}16+8\approx 2.4 \quad (48)$$

Accordingly, the right-hand side of equation (47) is given by the following expression.

$$P\text{in\_con\_n}-P\text{in\_min}\approx 2.4 \quad (49)$$

Consequently, the control of the present embodiment can set the minimum optical reception level at a value higher than that of the conventional optical communication system by about 2.4 (dB).

Third Embodiment

Figure 10:
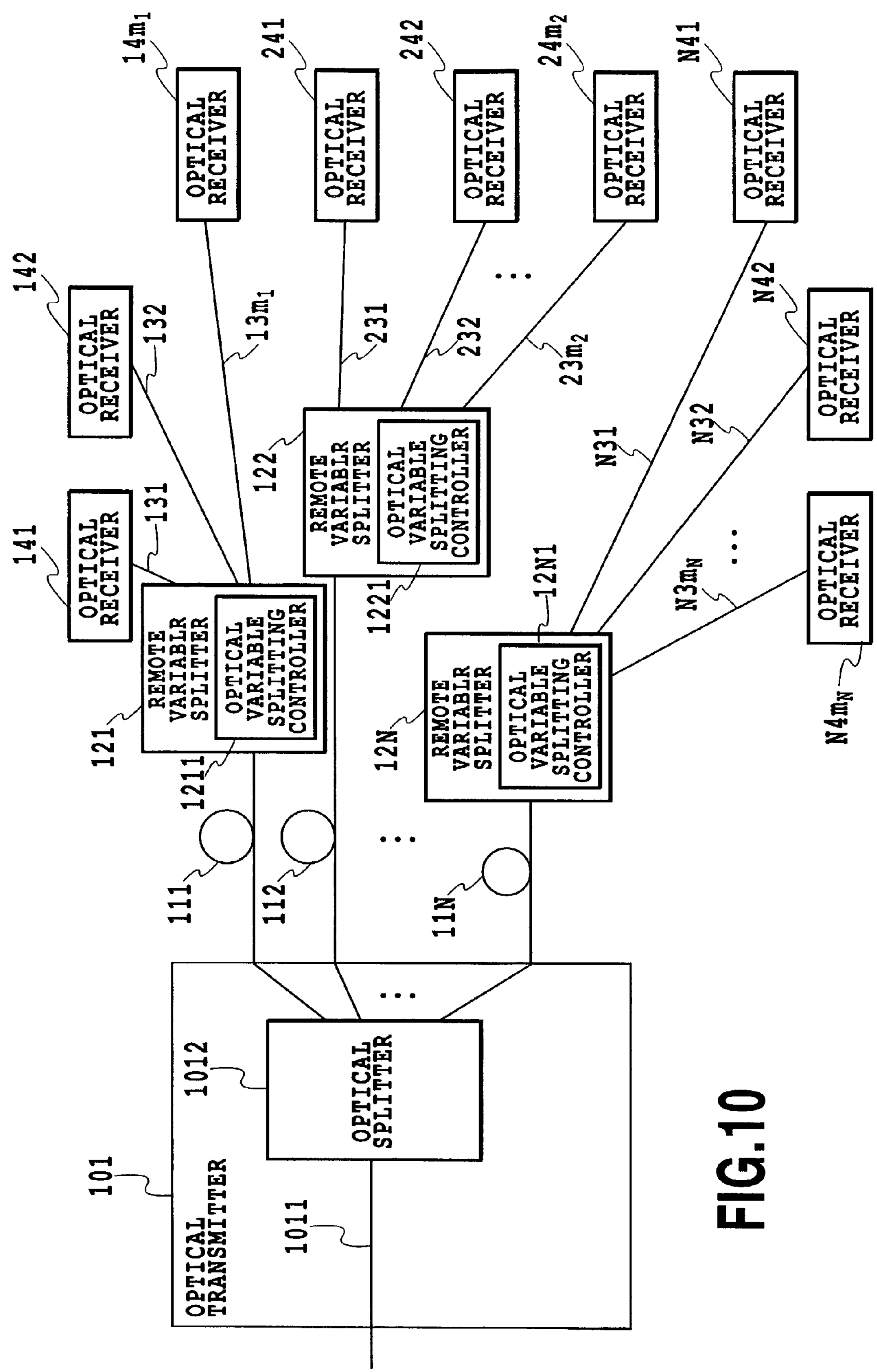
FIG. 10 is a block diagram showing the entire configuration of an embodiment of the optical communication system in accordance with the present invention.

As shown in FIG. 10, the third embodiment of the optical communication system in accordance with the present invention comprises: an optical transmitter 101 including an optical splitter 1012 for splitting the optical signal fed from an optical fiber 1011 to optical signals with the same optical output levels; N remote variable splitters 121, 122, . . . , and 12N including optical variable splitting controllers 1211, 1221, . . . , and 12N1 that are connected to the optical transmitter 101 via N optical fibers 111, 112, . . . , and 11N, and splitting the optical signals from the optical fibers 111, 112, . . . , and 11N to optical signals with regulating their output levels for the optical receivers by controlling the optical coupling ratios; and $m_1$ optical receivers 141, 142, . . . , and 14$m_1$, $m_2$ optical receivers 241, 242, . . . , and 24$m_2$, and $m_N$ optical receivers N41, N42, . . . , and N4$m_N$ that are connected to the individual remote variable splitters

121, 122, . . . , and 12N via $m_1$ optical fibers 131, 132, . . . , and 13$m_1$, $m_2$ optical fibers 231, 232, . . . , and 23$m_2$, and $m_N$ optical fibers N31, N32, . . . , and N3$m_N$.

In the present embodiment, the remote variable splitters 121 to 12N independently control the optical output levels of the optical signals which are produced by splitting the optical signal received from the optical fiber 111, and are sent to the individual optical receivers 141, 142, . . . , and 14$m_1$, the optical output levels of the optical signals which are produced by splitting the optical signal received from the optical fiber 112, and are sent to the individual optical receivers 241, 242, . . . , and 24$m_2$, and the optical output levels of the optical signals which are produced by splitting the optical signal received from the optical fiber 11N, and are sent to the individual optical receivers N41, N42, . . . and N4$m_N$.

It is preferable that the remote variable splitters control the optical output levels in such manner that the optical reception levels become equal for all the $m_i$ optical receivers. To explain this, let us compare the minimum optical reception level of the conventional example as shown in FIG. 2 with that of the present embodiment of the optical communication system. In the following description, the optical receiver connected to the optical transmitter via the ith and jth (j=1 to $m_i$) optical fibers is denoted as an optical receiver (ij) (i=1 to N, j=1 to $m_i$).

Assume that the optical output level of the preceding stage of each optical variable splitting controller is Pout (dBm), the optical loss from the output of the optical variable splitting controller to the optical receiver (i,j) associated with the optical variable splitting controller is L(i,j) (dB), and the optical reception level of the optical receiver (i,j) is Pin(i,j) (dBm). In addition, assume that the coupling ratios of the optical output levels of the optical variable splitting controller associated with the optical receivers (i,j) are given by the following equation.

$$k(i,\ j)\left(0 < k(i,\ j) < 1,\ (i = 1 \text{ to } N,\ j = 1 \text{ to } m_i),\ \sum_{j=1}^{m_i} K(i,\ j) = 1\right) \tag{50}$$

Then, the optical losses of the optical variable splitting controllers are given by $10\log_{10}(1/K(i,j))$ (dB). In addition, since the optical splitter has the splitting number N, and carries out the optical splitting such that the output signals have the same output levels, the optical splitter has an optical loss of $10\log_{10}N$ (dBm) per branch.

Furthermore, since the optical output levels are controlled such that the optical reception levels Pin(ij) are equal for all the $m_i$ optical receivers, the value is denoted as a constant value Pin_con_m(i) (dBm). Thus, the relationships between the optical output levels Pout (dBm) and the optical reception levels Pin_con_m(i) (dBm) are given by the following equation.

$$Pout-10\log_{10}N-10\log_{10}(1/K(i,j))-L(i,j)=Pin\_con\_m(i)(i=1 \text{ to } N, j=1 \text{ to } m_i) \tag{51}$$

Since the optical output levels are controlled such that the reception levels are equal for all the $m_i$ optical receivers, the following equations hold in equation (51).

$$\begin{aligned} &10\log_{10}N+10\log_{10}(1/K(i,1))+L(i,1)=A \\ &10\log_{10}N+10\log_{10}(1/K(i,2))+L(i,2)=A \\ &10\log_{10}N+10\log_{10}(1/K(i,m_i))+L(i,m_i)=A \end{aligned} \tag{52}$$

(A is constant and i=1 to N)

That is, $$\begin{aligned} &K(i,1)=10^{-A/10}\times N\times 10^{L(i,1)/10} \\ &K(i,2)=10^{-A/10}\times N\times 10^{L(i,2)/10} \\ &K(i,m_i)=10^{-A/10}\times N\times 10^{L(i,mi)/10} \end{aligned} \tag{53}$$

Summing up equations (53), the following equation is obtained.

$$\sum_{j=1}^{mi} K(i,\ j) = 10^{-A/10} \times N \times \sum_{j=1}^{mi} \times 10^{L(i,j)/10} \tag{54}$$

In equation (54), the following equation holds.

$$\sum_{j=1}^{m_i} K(i,\ j) = 1 \tag{55}$$

Consequently, $10^{-A/10}$ is given as $$10^{-A/10} = 1 \Bigg/ \left( N \times \sum_{j=1}^{mi} 10^{L(i,j)/10} \right) \tag{56}$$

From equations (53) and (56), the coupling ratio K(i,j) is given by the following equation.

$$K(i,\ j) = 10^{L(i,j)/10} \Bigg/ \sum_{j=1}^{mi} 10^{L(i,j)/10} (i = 1 \text{ to } N,\ j = 1 \text{ to } m_i) \tag{57}$$

Substituting equation (57) into equation (51), the following equation is obtained.

$$\text{Pout} - 10\log_{10}N - 10\log_{10}\sum_{j=1}^{mi} 10^{L(i,j)/10} = \text{Pin\_con\_m}(i) \quad (i = 1 \text{ to } N,\ j = 1 \text{ to } m_i) \tag{58}$$

Next, equation (58) −equation (4) is calculated as follows with changing i to u in equation (58) in order to compare the value Pin_con_m(i) (dBm) with Pin_min (dBm) under the same conditions.

$$-10\log_{10}\sum_{j=1}^{mi} 10^{L(u,j)/10} + 10\log_{10}m_u + L(u,\ v) \tag{59}$$

-continued $$= \text{Pin\_con\_m}(u) - \text{Pin\_min}$$

The left-hand side of equation (59) is given by $$\begin{aligned}\text{left-hand side} &= -10\log_{10}\sum_{j=1}^{mi} 10^{L(u,j)/10} + 10\log_{10} m_u + L(u, v) \\ &= 10\log_{10}\left[(m_u)\times 10^{L(u,v)/10} \Big/ \sum_{j=1}^{mi} 10^{L(u,j)/10}\right]\end{aligned} \quad (60)$$

in which since $$(m_u)\times 10^{L(u,v)/10} > \sum_{j=1}^{mi} 10^{L(u,j)/10} \quad (61)$$

holds, the following expression is given.

$$(m_u)\times 10^{L(u,v)/10} \Big/ \sum_{j=1}^{mi} 10^{L(u,j)/10} > 1 \quad (62)$$

Accordingly, $$\text{left-hand side} = 10\log_{10}\left[(m_u)\times 10^{L(u,v)/10} \Big/ \sum_{j=1}^{mi} 10^{L(u,j)/10}\right] > 0 \quad (63)$$

From equation (63), the right-hand side of equation (59) is given by the following expression.

$$P\text{in\_con\_m}(u) - P\text{in\_min} > 0 \quad (64)$$

From the foregoing description, it is seen that the optical reception levels Pin_con_m of the present embodiment of the optical communication system is higher than the minimum optical reception level Pin_min of the conventional system. Consequently, it is proved that the optical communication system of the present embodiment is superior to the conventional optical communication system.

Figure 11A:
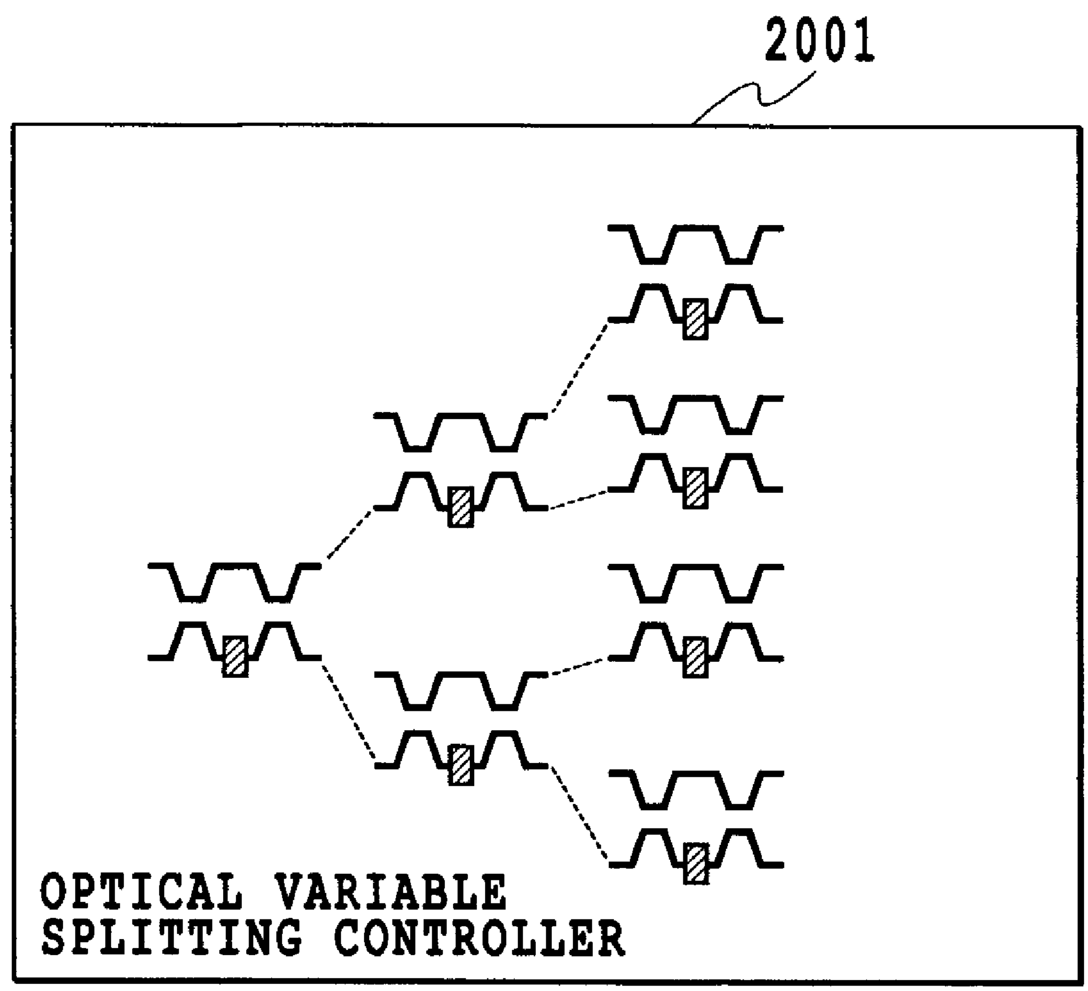
FIGS. 11A and 11B are diagrams showing a configuration of an optical variable splitting controller in the optical communication system in accordance with the present invention.
Figure 11B:
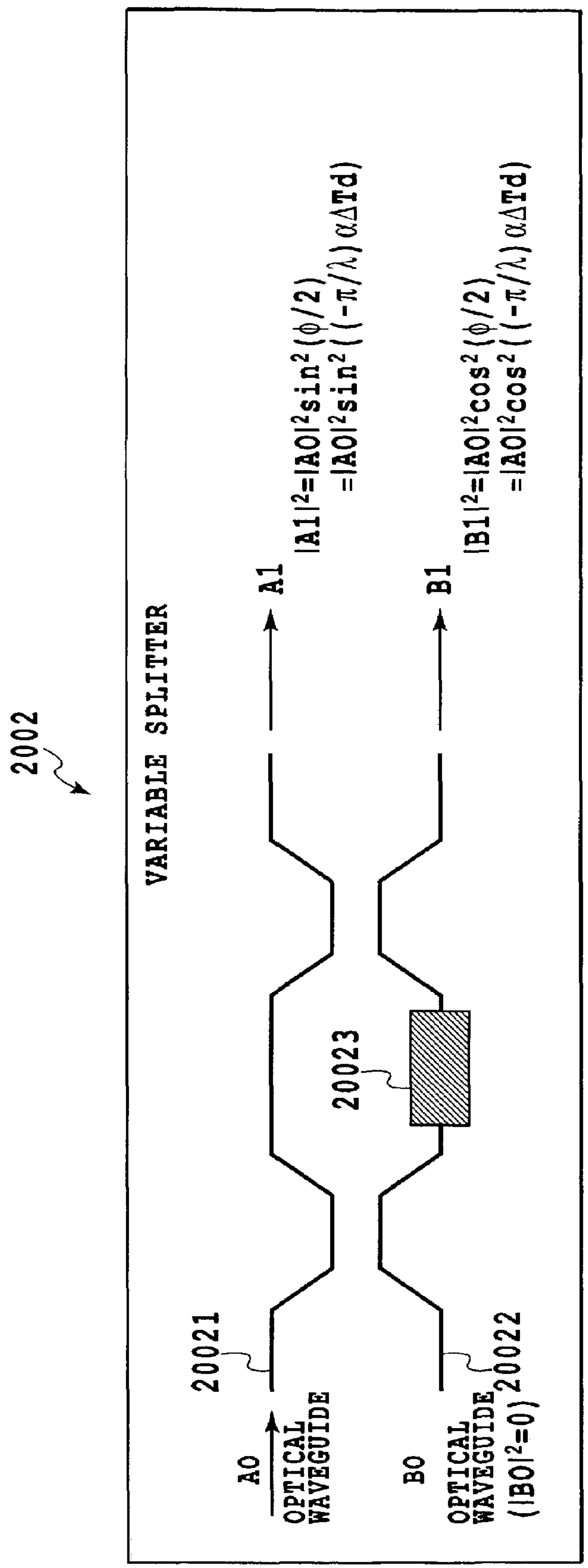

FIGS. 11A and 11B show a configuration of the optical variable splitting controller of the first to third embodiments of the optical communication system in accordance with the present invention, in which the optical variable splitting controller 2001 is configured by combining variable splitters 2002 in multiple stages.

The variable splitter 2002 has a thin film heater 20023 on the surface of an upper cladding of an optical waveguide 20022. It controls the optical output level by altering the refractive index or phase of the optical waveguide 20022 by the heat from the thin film heater 20023 utilizing the temperature dependence of the refractive index of the optical waveguide, that is, the thermooptic effect.

More specifically, assume that temperature change in the optical waveguide 20022 is ΔT, the refractive index of the optical waveguide 20022 before the temperature changes is n0, the refractive index of the optical waveguide 20022 after the temperature changes is n1, and the refractive index temperature coefficient of the optical waveguide 20022 is α. Then the following relationship holds.

$$n1 = n0 + \alpha\Delta T \quad (65)$$

In addition, assume that the length of the thin film heater 20023 is d, the phase variation due to the variations of the refractive index of the optical waveguides 20021 and 20022 are ϕ, and the wavelength of the light traveling through the optical waveguides 20021 and 20022 is λ. Then the following equation holds.

$$\phi = -(2\pi/\lambda)\times(n1 - n0)\times d \quad (66)$$

From equation (65), the following equation is obtained.

$$\phi = -(2\pi/\lambda)\times\alpha\Delta T\times d \quad (67)$$

Assume that the optical intensity of the optical waveguide 20021 at its input A0 is $|A0|^2$, the optical intensity of the optical waveguide 20022 at its input B0 is $|B0|^2=0$, the optical output level of the optical waveguide 20021 at its output A1 is $|A1|^2$, and the optical output level of the optical waveguide 20022 at its output B1 is $|B1|^2$. Then the following equations hold using equation (67).

$$\begin{aligned}|A1|^2 &= |A0|^2 \times \sin^2(\phi/2) \\ &= |A0|^2 \times \sin^2((-\pi/\lambda)\cdot\alpha\Delta T\cdot d))\end{aligned} \quad (68)$$

$$\begin{aligned}|B1|^2 &= |A0|^2 \times \cos^2(\phi/2) \\ &= |A0|^2 \times \cos^2((-\pi/\lambda)\cdot\alpha\Delta T\cdot d))\end{aligned} \quad (69)$$

Equations (68) and (69) show that the control of the temperature of the thin film heater 20023 makes it possible to freely control the optical output levels $|A1|^2$ and $|B1|^2$ (coupling ratio) of the optical waveguides 20021 and 20022.

Fourth Embodiment

Figure 12:
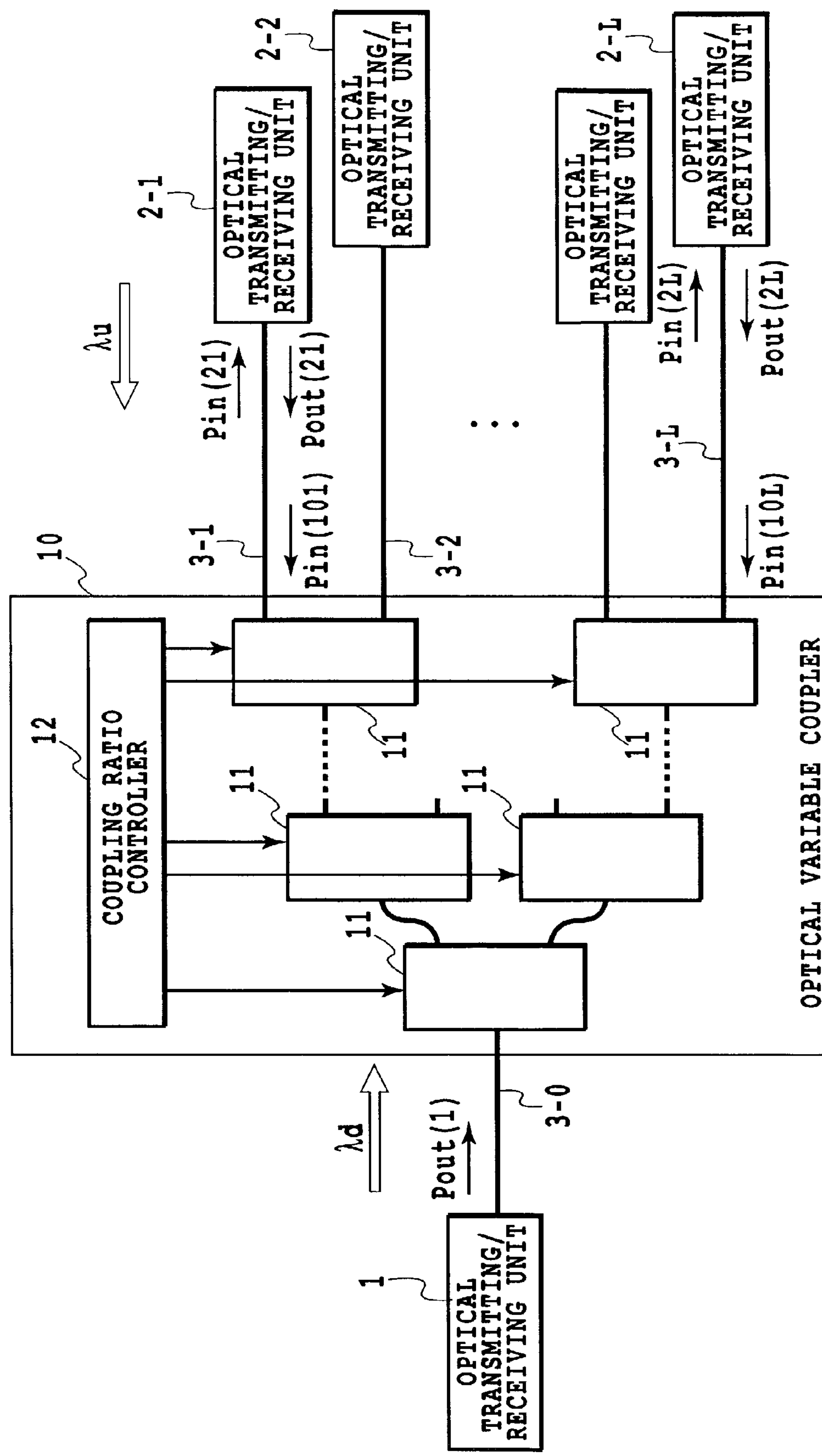
FIG. 12 is a block diagram showing a configuration of an embodiment of a two-way optical communication system in accordance with the present invention.

FIG. 12 shows an embodiment of a two-way optical communication system in accordance with the present invention. A single optical transmitting/receiving unit 1 is connected with L optical transmitting/receiving units 2-1 to 2-L in a one-to-L manner via an optical fiber 3-0, a 1×L optical variable coupling unit 10, and optical fibers 3-1 to 3-L. The optical variable coupling unit 10 splits a downlink optical signal with a wavelength λd transmitted from the optical transmitting/receiving unit 1 to L parts, and sends them to the optical transmitting/receiving units 2-1 to 2-L. On the other hand, it combines uplink optical signals with a wavelength λu transmitted from the optical transmitting/receiving units 2-1 to 2-L, and transmits the combined signal to the optical transmitting/receiving unit 1.

The optical variable coupling unit 10 of the present embodiment has a configuration in which a plurality of 1×2 optical variable couplers 11 are connected successively to implement the 1×L coupling. A coupling ratio controller 12 controls the coupling ratios of the individual 1×2 optical variable couplers 11 considering the transmission losses of the optical fibers 3-1 to 3-L and the wavelength, thereby carrying out variable control of the 1×L coupling ratios in their entirety. As the 1×2 optical variable couplers 11, Mach-Zehnder interferometer type couplers are used whose coupling ratios are varied by temperature control or by electric field control, for example. To control the coupling ratios by temperature, the 1×2 optical variable couplers can be configured as shown in FIG. 11B.

Since the coupling ratio has wavelength dependence, it must be controlled in accordance with the wavelength used. A control example will be described below.

The coupling ratio controller 12 of the optical variable coupling unit 10 stores a premeasured optical transmission level Pout(1) of the optical transmitting/receiving unit 1 and premeasured individual optical reception levels Pin(21) to Pin(2L) of the optical transmitting/receiving units 2-1 to 2-L.

The individual total optical losses between the optical transmitting/receiving unit 1 and the optical transmitting/receiving units 2-1 to 2-L are obtained as the difference between the premeasured Pout(1) and Pin(21), . . . , and the difference between the Pout(1) and Pin(2L), respectively. Here, the individual optical losses depend on the transmission loss of the optical fiber 3-0, the coupling ratios (coupling losses) of the optical variable coupling unit 10 (individual 1×2 optical variable couplers 11 on the passage) and the transmission losses of the individual optical fibers 3-1 to 3-L, and the coupling losses depend on the wavelength. Accordingly, the coupling ratios that make the difference between the maximum and minimum values of the individual total optical losses less than a specified value at the individual wavelengths can be obtained by carrying out calculation with varying the coupling ratios at the wavelengths λd and λu.

The coupling ratio controller 12 controls the individual 1×2 optical variable couplers 11 to set their coupling ratios at such values that can make the following differences less than the specified values. The differences are the difference between the minimum optical reception level and maximum optical reception level of the downlink optical signals with the wavelength λd received by the optical transmitting/receiving units 2-1 to 2-L, and the difference between the minimum optical reception level and maximum optical reception level of the uplink optical signals with the wavelength λu sent from the optical transmitting/receiving units 2-1 to 2-L to the optical transmitting/receiving unit 1.

Figure 13:
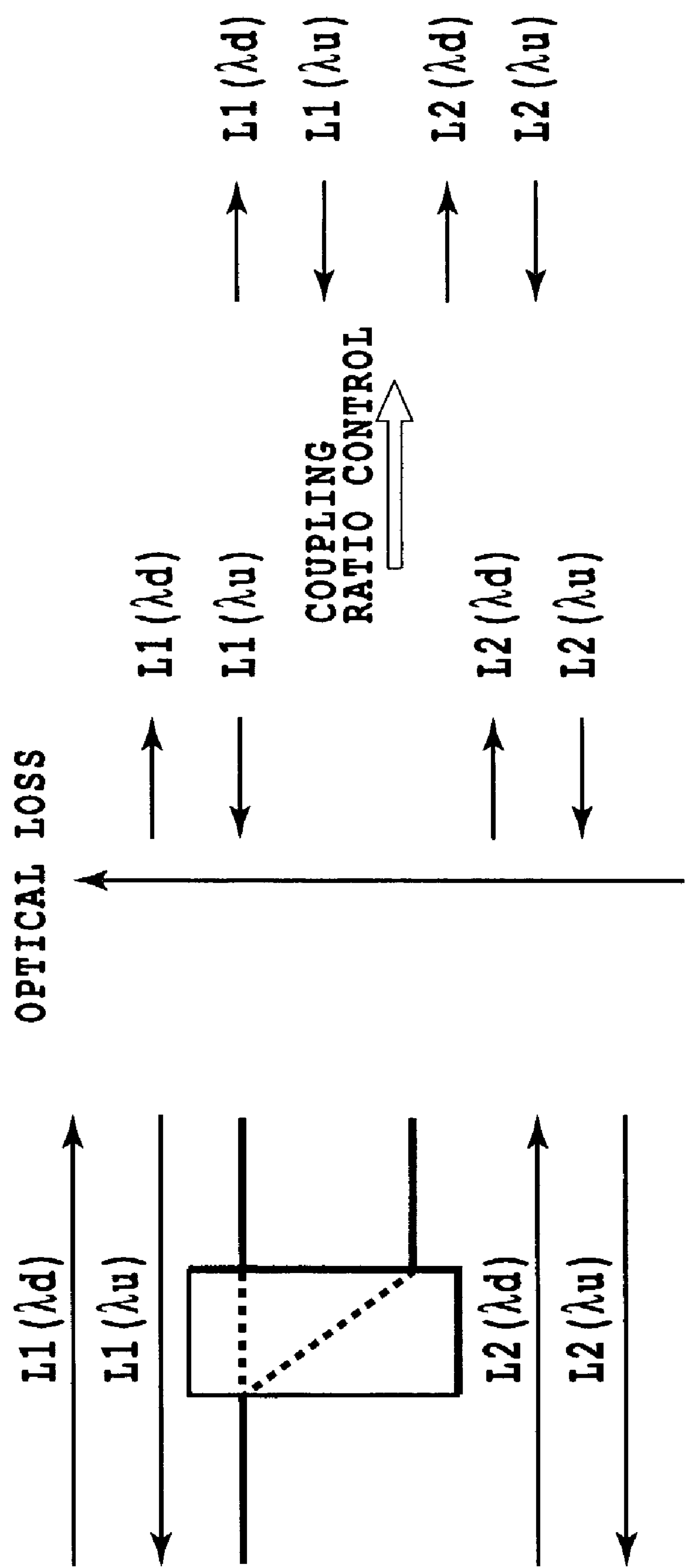
FIG. 13 is a diagram illustrating a control example of a 1×2 optical variable coupler.

FIG. 13 illustrates a first control example of the 1×2 optical variable couplers 11. Assume that a first total optical loss between the transmitter and a receiver at wavelength λd is L1(λd), and a second total optical loss is L2(λd), that a first total optical loss between the transmitter and the receiver at the wavelength λu is L1(λu) and a second total optical loss is L2(λu), and that L1(λd)>L1(λu)>L2(λd)>L2(λu). The coupling ratios are controlled such that the difference between the maximum value (L1(λd)) and the minimum value (L2(λu)) becomes less than a specified value.

When a wavelength division multiplexed optical signal is used as the downlink optical signals or uplink optical signals, the coupling ratio is set that makes the difference between the maximum value and the minimum value of the total optical loss between the transmitter and receiver at each wavelength less than the specified value.

Fifth Embodiment

The coupling ratio controller 12 of the optical variable coupling unit 10 stores a premeasured optical transmission level Pout(1) of the optical transmitting/receiving unit 1 and premeasured individual optical reception levels Pin(21) to Pin(2L) of the optical transmitting/receiving units 2-1 to 2-L, and premeasured individual optical transmission levels Pout(21) to Pout(2L) of the optical transmitting/receiving units 2-1 to 2-L.

The individual total optical losses between the optical transmitting/receiving unit 1 and the optical transmitting/receiving units 2-1 to 2-L are each obtained as the difference between the premeasured Pout(1) and Pin(21), . . . , and the difference between the Pout(1) and Pin(2L). Here, as for the individual optical transmission levels Pout(1), and Pout(21) to Pout(2L), the optical reception levels of the downlink optical signals at the optical transmitting/receiving units 2-1 to 2-L and the optical reception levels of the uplink optical signals at the optical transmitting/receiving unit 1 depend on the transmission loss of the optical fiber 3-0, the coupling ratios (coupling losses) of the optical variable coupling unit 10 and the transmission losses of the individual optical fibers 3-1 to 3-L, and the coupling losses depend on the wavelength. Accordingly, the coupling ratios that make the minimum values of the individual received levels greater than a specified value can be obtained by carrying out calculation with varying the coupling ratios at the wavelengths λd and λu.

The coupling ratio controller 12 can place the minimum optical reception levels of the optical transmitting/receiving unit 1 and optical transmitting/receiving units 2-1 to 2-L at a value greater than the specified value by setting the coupling ratios of the individual 1×2 optical variable couplers 11 by controlling them.

Figure 14:
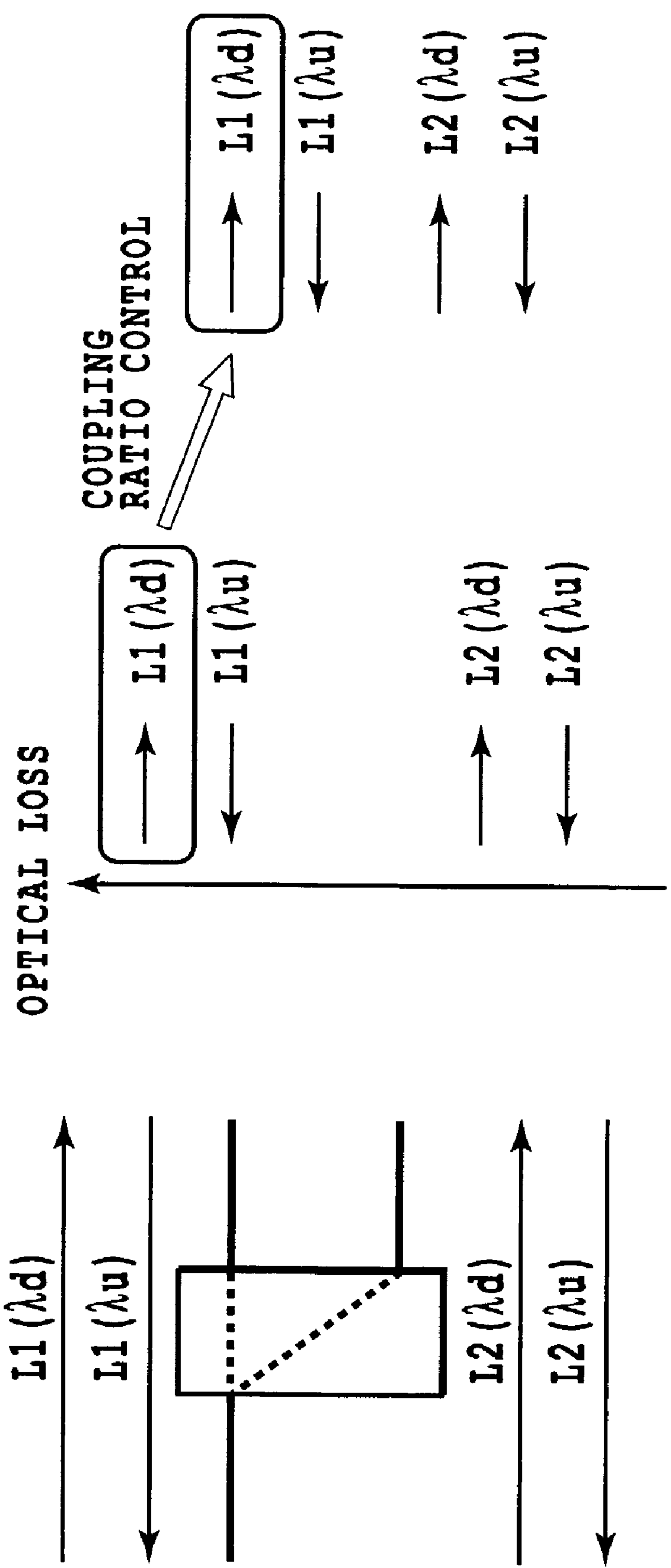
FIG. 14 is a diagram illustrating another control example of the 1×2 optical variable coupler.

FIG. 14 illustrates a second control example of the 1×2 optical variable couplers 11. Assume that a first total optical loss between the transmitter and a receiver at wavelength λd is L1(λd), and a second total optical loss is L2(λd), that a first total optical loss between the transmitter and the receiver at the wavelength λu is L1(λu) and a second total optical loss is L2(λu), and that L1(λd)>L1(λu)>L2(λd)>L2(λu). The coupling ratios are controlled such that the maximum value (L1(λd)) is less than the specified value, that is, the minimum values of the individual optical reception levels become greater than the specified value.

When a wavelength division multiplexed optical signal is used as the downlink optical signals or uplink optical signals, the coupling ratios are calculated such that the minimum reception levels become greater than a specified value for the respective wavelengths.

Sixth Embodiment

The coupling ratio controller 12 of the optical variable coupling unit 10 stores premeasured individual optical transmission levels Pout(21) to Pout(2L) of the optical transmitting/receiving units 2-1 to 2-L, and measures and stores the individual optical reception levels Pin(101) to Pin(10L) of the uplink optical signals at the optical variable coupling unit 10. Incidentally, the means for measuring the individual optical reception levels Pin(101) to Pin(10L) of the incoming uplink optical signals from the optical fibers 3-1 to 3-L to the optical variable coupling unit 10 is omitted from FIG. 12.

The individual optical losses between the optical variable coupling unit 10 and the optical transmitting/receiving units 2-1 to 2-L are each obtained as the difference between the Pout(21) and Pin(101), . . . , and the difference between the Pout(2L) and Pin(10L). Here, the individual total optical losses between the optical transmitting/receiving unit 1 and the optical transmitting/receiving units 2-1 to 2-L depend on the transmission loss of the optical fiber 3-0, coupling ratios (coupling losses) at the optical variable coupling unit 10 and the transmission losses (measured values) of the individual optical fibers 3-1 to 3-L, and the coupling losses depend on the wavelength. Accordingly, the coupling ratios that make the difference between the maximum and minimum values of the individual total optical losses less than a specified value at the individual wavelengths can be obtained by carrying out calculation with varying the coupling ratios at the wavelengths λd and λu. The coupling ratio controller 12 controls the individual 1×2 optical variable couplers 11 to set their coupling ratios at such values that can make the following differences less than the specified values. The differences are the difference between the minimum optical reception level and maximum optical reception level of the downlink optical signals with the wavelength λd received by the optical transmitting/receiving units 2-1 to 2-L, and the difference between the minimum optical reception level and maximum optical reception level of the uplink optical signals with the wavelength λu sent from the optical transmitting/receiving units 2-1 to 2-L to the optical transmitting/receiving unit 1.

When a wavelength division multiplexed optical signal is used as the downlink optical signals or uplink optical signals, the coupling ratio is set that makes the difference between the maximum value and the minimum value of the total optical loss between the transmitter and receiver at each wavelength less than the specified value.

In addition, the optical reception levels of the uplink optical signals at the optical transmitting/receiving unit 1 depend on the individual optical transmission levels Pout(21) to Pout(2L), the coupling ratios (coupling losses) of the optical variable coupling unit 10 and the transmission losses of the individual optical fibers 3-1 to 3-L, and the coupling losses depend on the wavelength. Accordingly, the coupling ratios that make the minimum values of the individual received levels greater than the specified value can be obtained by carrying out calculation with varying the coupling ratios at the wavelengths λd and λu.

The coupling ratio controller 12 can place the minimum optical reception levels of the optical transmitting/receiving unit 1 and optical transmitting/receiving units 2-1 to 2-L at a value greater than the specified value by setting the coupling ratios of the individual 1×2 optical variable couplers 11 by controlling them.

When a wavelength division multiplexed optical signal is used as the downlink optical signals or uplink optical signals, the coupling ratios are calculated such that the minimum reception levels become greater than a specified value for the respective wavelengths.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An optical communication system comprising: an optical transmitter including a multistage optical variable splitting controller for splitting received light into N parts, and supplying them to N optical fibers, where N is an integer greater than one: and N optical receivers for receiving the output light of said optical transmitter via the N optical fibers, wherein said multistage optical variable splitting controller regulates its output levels to be delivered to said optical receivers independently by controlling its optical coupling ratios, and wherein said multistage optical variable splitting controller regulates its optical output levels by controlling its optical coupling ratios such that optical reception levels become equal for all the N optical receivers.

2. An optical communication system comprising: an optical transmitter including a multistage optical variable splitting controller for splitting received light into N parts, and supplying them to N optical fibers, where N is an integer greater than one; N optical couplers for receiving outputs of said optical transmitter via the N optical fibers, each of said N optical couplers delivering its received signal to $m_i$ optical fibers, where suffix i varies from one to N; and $m_i$ optical receivers for receiving outputs of one of said N optical couplers via the $m_i$ optical fibers, wherein said optical variable splitting controller regulates its output levels to be delivered to said optical receivers independently by controlling its optical coupling ratios, and wherein as for N optical receivers, each of which has a maximum optical loss from an input of the one of said optical couplers to inputs of said $m_i$ optical receivers connected to the one of said optical couplers, said multistage optical variable splitting controller regulates its optical output levels by controlling its optical coupling ratios such that optical reception levels become equal for all of said N optical receivers.

3. An optical communication system comprising: an optical transmitter including an optical splitter for splitting received light into N parts with equal output levels, and supplying them to N optical fibers, where N is an integer greater than one; N remote variable splitters for receiving outputs of said optical transmitter via the N optical fibers, each of said N remote variable splitters including a multistage optical variable splitting controller that splits a received optical signal to $m_i$ parts and supplies them to $m_i$ optical fibers, where suffix i varies from one to N; and $m_i$ optical receivers for receiving outputs of one of said N remote variable splitters via the $m_i$ optical fibers, wherein said multistage optical variable splitting controller regulates its output levels to be delivered to said optical receivers independently by controlling its optical coupling ratios, and wherein said multistage optical variable splitting controller regulates its optical output levels by controlling its optical coupling ratios such that optical reception levels become equal for all $m_i$ optical receivers.

4. A two-way optical communication system comprising: a first optical transmitting/receiving unit; L second optical transmitting/receiving units, where L is an integer greater than one; and a multistage 1×L optical coupler connected to said first optical transmitting/receiving unit and to said L second optical transmitting/receiving units via optical fibers, said multistage 1×L optical coupler splitting a downlink optical signal with a wavelength λd transmitted from said first optical transmitting/receiving unit into L parts and transmitting them to said second optical transmitting/receiving units, and combining uplink optical signals with a wavelength λu transmitted from said second optical transmitting/receiving units and transmitting the combined signal to said first optical transmitting/receiving unit, wherein said multistage 1×L optical coupler includes means for controlling coupling ratios for said second optical transmitting/receiving units such that a difference between a minimum optical reception level and a maximum optical reception level of the downlink optical signals arriving at said second optical transmitting/receiving units is less than a specified value, and that a difference between a minimum optical reception level and a maximum optical reception level of the uplink optical signals arriving at said first optical transmitting/receiving unit from said second optical transmitting/receiving units is less than a specified value.

5. The two-way optical communication system as claimed in claim 4, wherein said multistage 1×L optical coupler determines its coupling ratios such that the difference between the minimum optical reception level and the maximum optical reception level becomes less than the specified value in accordance with a premeasured optical transmission level of said first optical transmitting/receiving unit and premeasured optical reception levels of said second optical transmitting/receiving units.

6. The two-way optical communication system as claimed in claim 4, wherein said multistage 1×L optical coupler determines its coupling ratios such that the difference between the minimum optical reception level and the maximum optical reception level becomes less than the specified value in accordance with premeasured optical transmission levels of the uplink optical signals of said second optical transmitting/receiving units, and optical reception levels of the uplink optical signals measured at said multistage 1×L optical coupler.

7. The two-way optical communication system as claimed in any one of claims 2 to 3, or 5 to 6 wherein the downlink optical signals are a wavelength division multiplexed optical signal that multiplexes at least two wavelengths, wherein said second optical transmitting/receiving units each receive optical signals with one or more wavelengths from the wavelength division multiplexed optical signals, and wherein said multistage 1×L optical coupler determines the coupling ratios considering wavelength dependence of the coupling ratios.

8. The two-way optical communication system as claimed in any one of claims 2 to 3, or 5 or 6 wherein said second optical transmitting/receiving units each transmit an optical signal with one or more wavelengths as the uplink optical signal, and wherein said multistage 1×L optical coupler determines the coupling ratios considering wavelength dependence of the coupling ratios.

9. A two-way optical communication system comprising:

a first optical transmitting/receiving unit; L second optical transmitting/receiving units, where L is an integer greater than one; and a multistage 1×L optical coupler connected to said first optical transmitting/receiving unit and to said L second optical transmitting/receiving units via optical fibers, said multistage 1×L optical coupler splitting a downlink optical signal with a wavelength λd transmitted from said first optical transmitting/receiving unit into L parts and transmitting them to said second optical transmitting/receiving units, and combining uplink optical signals with a wavelength λu transmitted from said second optical transmitting/receiving units and transmitting the combined signal to said first optical transmitting/receiving unit, wherein said multistage optical coupler includes means for controlling coupling ratios for said second optical transmitting/receiving units such that a minimum optical reception level of the downlink optical signals arriving at said second optical transmitting/receiving units is greater than a specified value, and that a minimum optical reception level of the uplink optical signals arriving at said first optical transmitting/receiving unit from said second optical transmitting/receiving units is greater than a specified value.

10. The two-way optical communication system as claimed in claim 9, wherein said multistage 1×L optical coupler determines its coupling ratios such that the minimum optical reception level of the downlink optical signals and the minimum optical reception level of the uplink optical signals each become greater than the specified value in accordance with a premeasured optical transmission level of said first optical transmitting/receiving unit, premeasured optical reception levels of said second optical transmitting/receiving units, and premeasured optical transmission levels of said second optical transmitting/receiving units.

11. The two-way optical communication system as claimed in claim 9, wherein said multistage 1×L optical coupler determines its coupling ratios such that the minimum optical reception level becomes greater than the specified value in accordance with premeasured optical transmission levels of the uplink optical signals of said second optical transmitting/receiving units, and optical reception levels of the uplink optical signals measured at said multistage 1×L optical coupler.

* * * * *